(12) United States Patent
Rosenstengel

(10) Patent No.: US 8,340,388 B2
(45) Date of Patent: Dec. 25, 2012

(54) SYSTEMS, COMPUTER-READABLE MEDIA, METHODS, AND MEDICAL IMAGING APPARATUS FOR THE AUTOMATED DETECTION OF SUSPICIOUS REGIONS OF INTEREST IN NOISE NORMALIZED X-RAY MEDICAL IMAGERY

(75) Inventor: John E. Rosenstengel, Beavercreek, OH (US)

(73) Assignee: iCad, Inc., Nashua, NH (US)

( * ) Notice: Subject to any disclaimer, the term of this patent is extended or adjusted under 35 U.S.C. 154(b) by 650 days.

(21) Appl. No.: 12/611,413

(22) Filed: Nov. 3, 2009

(65) Prior Publication Data

US 2011/0103673 A1 May 5, 2011

(51) Int. Cl.
G06K 9/00 (2006.01)
A61B 6/04 (2006.01)

(52) U.S. Cl. .................. 382/132; 382/131; 378/37

(58) Field of Classification Search .......... 382/131, 382/132; 378/37
See application file for complete search history.

(56) References Cited

U.S. PATENT DOCUMENTS

| | | | | |
|---|---|---|---|---|
| 5,598,481 | A | * | 1/1997 | Nishikawa et al. ........ 382/130 |
| 5,657,362 | A | * | 8/1997 | Giger et al. .............. 378/37 |
| 5,673,332 | A | * | 9/1997 | Nishikawa et al. ........ 382/128 |
| 5,799,100 | A | * | 8/1998 | Clarke et al. ............ 382/132 |
| 5,825,936 | A | * | 10/1998 | Clarke et al. ............ 382/261 |
| 5,982,916 | A | * | 11/1999 | Kuhn ................... 382/132 |
| 5,999,639 | A | | 12/1999 | Rogers et al. |
| 6,167,146 | A | | 12/2000 | Rogers et al. |
| 6,205,236 | B1 | | 3/2001 | Rogers et al. |
| 6,389,157 | B2 | | 5/2002 | Rogers et al. |
| 6,542,628 | B1 | | 4/2003 | Muller et al. |
| 2008/0187194 | A1 | | 8/2008 | Zhang et al. |
| 2009/0207969 | A1 | * | 8/2009 | Fischer et al. ........... 378/37 |

OTHER PUBLICATIONS

Karssemeijer, Adaptive Noise Equalization and Image Analysis in Mammography, Department of Diagnostic Radiology, vol. 687, 1993, pp. 472-486.*
Veldkamp et al., Normalization of Local Contrast in Mammograms, IEEE Transaction on Medical Imaging, vol. 19, No. 7, Jul. 2000, pp. 731-738.*
McLoughlin et al., "Noise equalization for detection of microcalcification clusters in direct digital mammogram images", IEEE Transactions on Medical Imaging, Mar. 23, 2004; pp. 313-320.
Veldkamp, W.; Karssemeijer, N.; "Improved correction for signal dependent noise applied to automatic detection of microcalcification", Computational Imaging and Vision, 1998, vol. 13, pp. 169-176.

* cited by examiner

*Primary Examiner* — Alexander H Taningco
(74) *Attorney, Agent, or Firm* — William A. Loginov; Loginov & Associates, PLLC

(57) ABSTRACT

Systems, computer-readable media, methods, and a medical imaging apparatus for improving the automated detection of suspicious regions of interest in x-ray images of anatomical organs under study are disclosed. Noise effects in x-ray images are suppressed to predetermined levels by filtering the original x-ray images and then combining the original images with the filtered images in such a way that the predetermined noise value is met. The resulting modified x-ray images then may be analyzed to automatically detect suspected breast microcalcifications or other suspicious regions of interest. In addition, three-dimensional digital images of anatomical organs may be computed from a plurality of such modified x-ray images of an anatomical organ taken from different angles, as in CT imaging, and the three-dimensional digital images may be processed to automatically detect suspicious regions of interest.

87 Claims, 9 Drawing Sheets

SYSTEMS, COMPUTER-READABLE MEDIA, METHODS, AND MEDICAL IMAGING APPARATUS FOR THE AUTOMATED DETECTION OF SUSPICIOUS REGIONS OF INTEREST IN NOISE NORMALIZED X-RAY MEDICAL IMAGERY

FIELD

Systems, computer-readable media, medical imaging apparatus, and methods for the automatic analysis of medical x-ray images are disclosed. More specifically, systems, computer-readable media, medical imaging apparatus, and methods for improving the automated detection of suspicious regions of interest in anatomical regions under study by automatically suppressing noise artifacts to predetermined levels in medical x-ray images of such anatomical regions are disclosed.

BACKGROUND

According to "Recent Advances in Breast Imaging, Mammography, and Computer-Aided Diagnosis of Breast Cancer", *SPIE Press*, Bellingham, Wash., 2006, breast cancer is the most common type of cancer in women worldwide. Clear evidence shows that early diagnosis and treatment of breast cancer may significantly increase the change of survival for patients. One sign for early detection of breast cancer may be the presence and appearance of microcalcifications. The National Cancer Institute describes microcalcifications as specks of calcium that may be found in an area of rapidly dividing cells. Many microcalcifications clustered together may be a sign of cancer. Other signs may include dense and/or spiculated masses.

Mammography is the process of using low-dose x-rays to examine the human breast. Mammograms may make it possible to detect microcalcifications. Microcalcifications may appear as small, clustered regions of elevated signal intensity against the varying background density of the x-ray mammogram. The radiometric density of microcalcifications along with their small spatial extent, typically less than 1 mm in each dimension, may result in localized regions of high contrast.

Many prior art systems, computer programs, and methods have been disclosed for automatically detecting signals indicative of suspicious microcalcifications in mammograms. Examples can be seen in U.S. Pat. Nos. 5,999,639, 6,167,146, 6,205,236, and 6,389,157, which are fully incorporated herein by reference. Mammograms may be highlighted at key detection spots for further analysis and diagnosis by a radiologist. Evidence indicates that radiologists who use such automated detection schemes may improve their overall detection rates while also being able to focus on the characterization of different cluster types and subsequent treatment options.

One problem that may reduce the accuracy of automated microcalcification detection schemes is the presence of noise in the mammograms. Noise may appear in the image as a result of the type of sensor used to acquire the mammogram, imaging parameters used in acquiring the mammogram (e.g., dose or exposure), and/or the composition of the breast imaged (e.g., fatty versus dense breast tissue). Noise may be particularly problematic for microcalcification region of interest detection because of the small spatial extent of microcalcifications. The measurable signal of a microcalcification may be quite small, and thus, noise may easily obscure such a signal or masquerade as microcalcification.

Some prior art approaches address this problem by normalizing the noise of a mammogram based on the gray-scale content of the image and a priori knowledge of the characteristics of the source used to capture the image. For example, each sensor of a mammographic x-ray imaging system has a different gray-scale dependent noise model (GDNM). Examples of such prior art approaches may be seen in, for example, "Improved correction for signal dependent noise applied to automatic detection of microcalcifications," Veldkamp, W. Karssemeijer, N., COMPUTATIONAL IMAGING AND VISION, 1998, VOL 13, pages 169-176; "Noise equalization for detection of microcalcification clusters in direct digital mammogram images," McLoughlin et al., *IEEE Trans Med Imaging*, 2004 March; 23 (3):313-20; and Published U.S. Patent Application 2008/0187194, "CAD image normalization.")

The prior art approaches, however, do not solve the problem of the variation in noise level from image to image. Computer systems that process x-ray images must deal with potentially varying noise statistics from x-ray image to x-ray image. This may be particularly problematic for computer systems that must identify microcalcifications in a wide variety of x-ray images having highly variable noise statistics. Changing the processing parameters of an algorithm in response to the amount of noise in each image is one prior art solution to this problem. (See, for example, U.S. Pat. No. 6,542,628 "Method for detection of elements of interest in a digital radiographic image," assigned to GE Medical Systems, S.A., where a detection threshold value is changed in response to the amount of measured image noise.)

SUMMARY

Embodiments of methods (and associated systems and computer-readable media) to identify and output suspicious regions of interest in a digital x-ray image of at least a portion of an anatomical region under study, comprise receiving, through at least one input device, a digital x-ray image of at least a portion of an anatomical region under study, the digital x-ray image being characterized by first global noise characteristics; computing, in at least one processor, a first global noise estimate for at least a portion of the received image; computing, in at least one processor, a modified digital x-ray image of at least a portion of the anatomical region under study, the modified digital x-ray image being characterized by second global noise characteristics, wherein, the modified digital x-ray image has associated with it a second global noise estimate of about a predetermined noise value; identifying, in at least one processor, at least one suspicious region of interest in the at least a portion of the anatomical region under study using the modified digital x-ray image; and outputting, through at least one output device for use by at least one user, information associated with the at least one suspicious region of interest identified.

Outputting may comprise displaying at least one image of at least a portion of the anatomical region under study wherein the at least one suspicious region of interest identified is specially depicted.

The modified image may be computed based upon at least a portion of the digital x-ray image and at least a portion of a filtered x-ray image of the anatomical region under study. The methods may further comprise normalizing the noise of at least a portion of the digital x-ray image prior to computing the modified image. Normalizing the noise of at least a portion of the digital x-ray image may comprise gray-scale dependent noise normalization. The first global noise estimate may be computed based upon the gray-scale dependent noise normalization of at least a portion of the digital x-ray image. At least a portion of the filtered x-ray image may have associated with it a third global noise estimate, the third global noise estimate being less than the first global noise estimate. The modified image may be computed based upon at least a portion of the digital x-ray image and at least a portion of the filtered x-ray image by using the first global noise estimate, the predetermined noise value, and the third global noise estimate. The modified image may be computed by combining a weighted average of the at least a portion of digital x-ray image and at least a portion of the filtered x-ray image. The modified image may be computed by combining a weighted average of individual pixels of at least a portion of the digital x-ray image and individual pixels of at least a portion of the filtered x-ray image. Weights of at least a portion of the digital x-ray image and of at least a portion of the filtered x-ray image may be computed by means of a hyperbolic function. The hyperbolic function may be of a form $$\frac{(x-h)^2}{a^2} - \frac{(y-k)^2}{b^2} = 1,$$

where x is a weight of at least a portion of the digital x-ray image, y is the predetermined noise value, h=0, a is a constant, and b and k are determined from the first global noise estimate and the third global noise estimate. The modified digital x-ray image may be a globally noise normalized image.

Identifying at least one suspicious region of interest may comprise measuring statistics of the modified image and comparing the measured statistics against parametric characteristics of suspicious regions of interest. The measured statistics may be compared against parametric characteristics of microcalcifications.

The anatomical region under study may comprise at least a portion of a human breast. The digital x-ray image may be produced by at least one of a mammography imaging system, a computed tomography imaging system, and a tomosynthesis mammography imaging system.

Embodiments of methods (and associated systems and computer-readable media) to identify and output suspicious regions of interest in a digital x-ray image of at least a portion of an anatomical region under study comprise obtaining by means of at least one imaging source a plurality of digital x-ray images of at least a portion of an anatomical region under study in response to x-rays propagated through a patient; wherein each image in the plurality of images represents a view of at least a portion of the anatomical region under study from a different angle; computing in at least one processor a plurality of modified digital x-ray images from at least a portion of the digital x-ray images such that a global noise estimate of each modified digital x-ray image is about a predetermined noise value; processing in at least one processor a plurality of modified digital x-ray images to identify at least one suspicious region of interest in the anatomical region under study; and outputting by means of at least one output device information associated with at least one suspicious region of interest identified.

The methods may further comprise computing in at least one processor a three-dimensional digital image from a plurality of modified digital x-ray images and processing at least a portion of the three-dimensional digital image to identify at least one suspicious region of interest in the anatomical region under study. The methods may further comprise identifying in at least one processor at least one suspicious region of interest by processing pixels of individual slices of the three-dimensional digital image. The methods may further comprise identifying in at least one processor at least one suspicious region of interest by processing voxels of the three-dimensional digital image. The methods may further comprise computing in at least one processor a modified digital x-ray image by filtering at least a portion of a digital x-ray image and combining the digital x-ray image with a filtered digital x-ray image. The methods may further comprise combining in at least one processor a weighted average of at least a portion of the digital x-ray image and at least a portion of the filtered digital x-ray digital image to compute the modified digital x-ray image. The methods may further comprise computing in at least one processor the modified digital x-ray image using a global noise estimate of the digital x-ray image, a global noise estimate of the filtered digital x-ray image, and the predetermined noise value. The at least one imaging source may be at least one of a tomosynthesis medical imaging apparatus and a computed tomography medical imaging apparatus.

Embodiments of methods (and associated systems and computer-readable media) to identify and output suspicious regions of interest in a digital x-ray image of at least a portion of an anatomical region under study comprise: receiving, through at least one input device, a digital x-ray image of at least a portion of an anatomical region under study, the digital x-ray image being characterized by first global noise characteristics; filtering, in at least one processor, at least a portion of the received digital x-ray image; mixing, in at least one processor, the filtered at least a portion of the received digital x-ray image with a corresponding at least a portion of the received digital x-ray image, to create a mixed digital x-ray image such that a global noise estimate of the mixed digital x-ray image is about a predetermined noise value; identifying, in at least one processor, at least one suspicious region of interest in the anatomical region under study based on the mixed digital x-ray image; and outputting, to at least one output device, information associated with the at least one suspicious region of interest identified.

Outputting may comprise displaying at least a portion of the digital x-ray image of the anatomical region under study such that the at least one suspicious region of interest identified is specially depicted.

DETAILED DESCRIPTION

In the following detailed description of embodiments, reference is made to the accompanying drawings that form a part hereof, and in which are shown, by way of illustration and not by way of limitation, specific embodiments in which the methods and systems disclosed herein may be practiced. It is to be understood that other embodiments may be utilized and that logical, mechanical, and electrical changes may be made without departing from the scope of the methods and systems disclosed herein.

This disclosure is directed to a system, a computer-readable medium, a medical imaging apparatus, and a method for improving the automated detection of suspicious regions of interest in anatomical regions under study by automatically normalizing noise in x-ray images of such anatomical regions. In an embodiment of the disclosure, the x-ray images may be taken of an anatomical breast and used to determine if the breast is normal or abnormal. As is known in the art, if a breast is abnormal, suspicious regions of interest indicative of a disease state may be identifiable in the x-ray image. One example of such a suspicious region of interest is a cluster of microcalcifications, which may indicate the potential onset of cancer in the breast. However, the techniques described herein may also improve the automatic detection of other suspicious regions of interest in a breast, and may also be used to improve the automatic detection of regions of interest in x-ray images of other anatomical regions under study.

Figure 1:
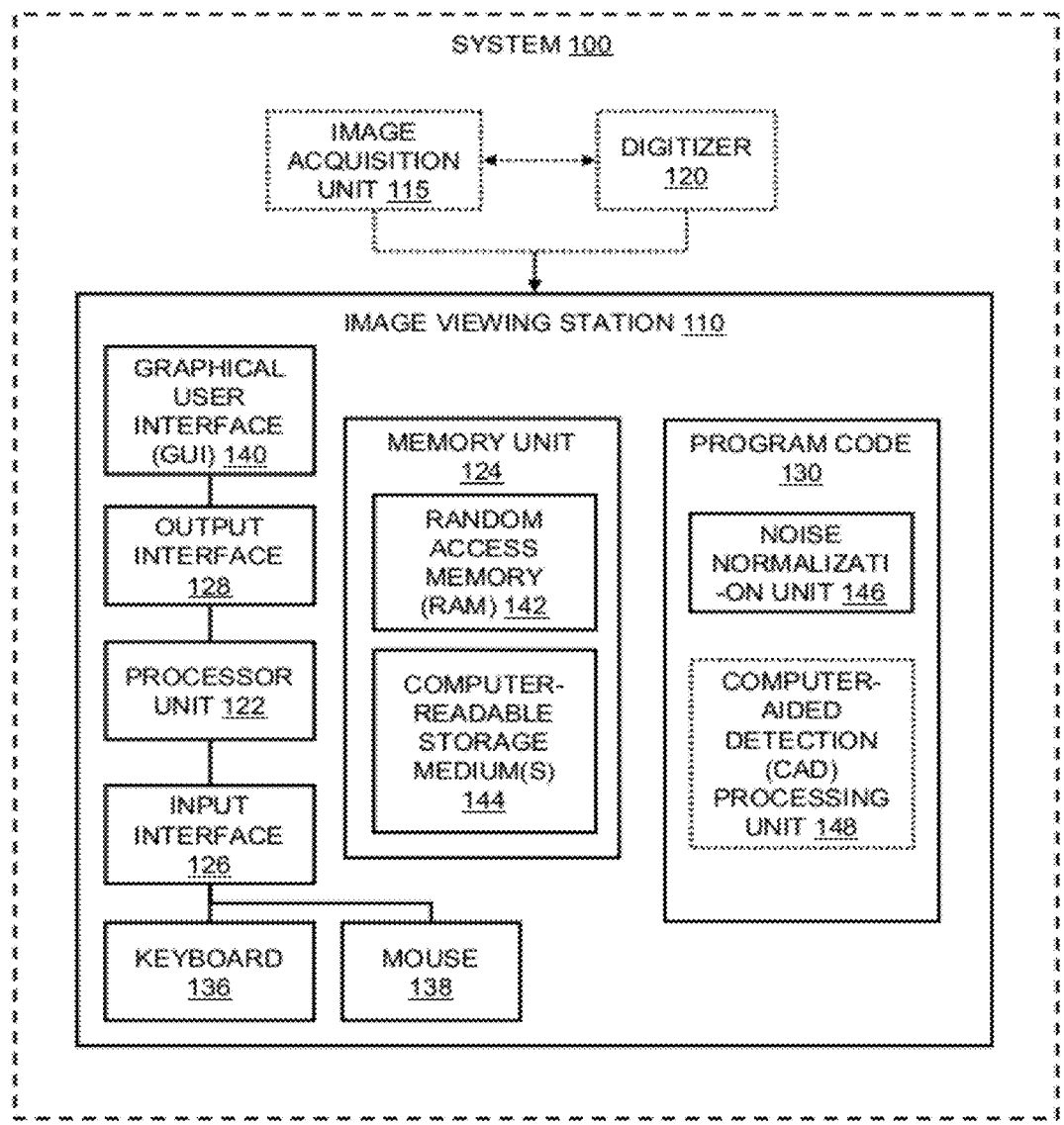
FIG. 1 is a block diagram of an illustrative system for acquiring and processing x-ray images of an anatomical region under study according to an embodiment of the disclosure.

FIG. 1 is a block diagram of an illustrative system 100 that may be used for acquiring and processing x-ray images in accordance with the methods disclosed herein. The system described is for reference purposes only. Other systems may be used in carrying out embodiments of the methods disclosed herein.

System 100 includes an image viewing station 110 for processing and outputting x-ray imagery to a physician or other user of the system. In certain embodiments, system 100 may further include an image acquisition unit 115 for acquiring the x-ray imagery by performing an x-ray imaging procedure (i.e., produce digital x-ray images of an anatomical region under study in response to x-rays transmitted through a patient). For example, in embodiments where the anatomical region under study is a breast, image acquisition unit 115 may be a computed radiographic (CR) mammography system such as those offered by AGFA Healthcare of Ridgefield Park, N.J. (AGFA); or Fujifilm Medical Systems of Stamford, Conn. (Fuji); a digital radiographic (DR) mammography system such as those offered by the General Electric Company of Fairfield, Conn. (GE); or a computed tomography medical imaging apparatus, such as a digital breast tomosynthesis (DBT) medical imaging apparatus offered by GE; Hologic, Inc. of Bedford, Mass. (Hologic); or Siemens AG of Munich, Germany (Siemens).

In an embodiment of the disclosure, image acquisition unit 115 may be capable of transmitting digital x-ray image data to image viewing station 110 for further processing. Image acquisition unit 115 may connect to and communicate with image viewing station 110 via one or more of any type or combination of types of communication interface, including but not limited to physical interfaces, network interfaces, software interfaces, and the like. The communication may be by means of a physical connection, or may be wireless, optical or by any other means. It will be understood by a person of skill in the art that image viewing station 110 and image acquisition unit 115 may be deployed as parts of a single system or, alternatively, as parts of multiple, independent systems, and that any such deployment may be utilized in conjunction with embodiments of the methods disclosed herein. If image viewing station 110 is connected to image acquisition unit 115 by a network or other direct computer connection, the network interface or other connection may be the input device for image viewing station 110 to receive imagery for processing by the methods and systems disclosed herein. Alternatively, image viewing station 110 may receive images for processing indirectly from image acquisition unit 115, as by use of transportable storage devices (not shown in FIG. 1) such as but not limited to CDs, DVDs or flash drives, in which case readers for said transportable storage devices may function as input devices for image viewing station 110 for processing images according to the methods disclosed herein.

In another embodiment of the disclosure, image acquisition unit 115 may connect to and communicate with a digitizer apparatus 120, such as but not limited to a laser scanner with approximately 50 micron resolution, for digitizing conventional developed x-ray images (e.g., mammograms, chest x-rays, etc.) of anatomical regions under study (e.g., anatomical breasts, anatomical lungs, etc.). Such x-ray images may be produced as films by image acquisition unit 115 and require digitizing prior to the execution of the methods disclosed hereinbelow by image viewing station 110. Image acquisition unit 115 and/or image viewing station 110 may connect to and communicate with digitizer apparatus 120 via any type of communication interface as described hereinabove.

In one embodiment of the disclosure, image viewing station 110 may be a general purpose computer system containing instructions for processing x-ray imagery and outputting the x-ray imagery and/or results of the processing in the form of data such as images (which may be modified or annotated to reflect the results of processing by methods disclosed herein). Image viewing station 110 may be comprised of components in a single computer or computer system, or its functions and components may be distributed among multiple physical structures. Thus, image viewing station 110 may further comprise one or more processor units 122, memory units 124, input interfaces 126, output interfaces 128, and program code 130 containing instructions that can be read and executed by the station. One or more input interfaces 126 may connect processor units 122 to input devices such as keyboards 136, mouse devices 138, and/or other suitable devices as will be known to a person of skill in the art, including for example and not by way of limitation voice-activated systems and touch screens. Thus, input interfaces 126 may allow users to communicate commands to the one or more processors. One such exemplary command is the execution of program code 130. Output interfaces 128 may further be connected to processor units 122 and one or more output devices such as graphical user interfaces (GUI) 140. Thus, output interfaces 128 may allow image viewing stations 110 to transmit data from the one or more processors to the one or more output devices, one such exemplary transmission including x-ray image data for display to a user. In addition, one or more output devices may also function as input interfaces 126 as for example by comprising touch-sensitive displays or screens.

Memory units 124 may include conventional semiconductor random access memory (RAM) 142 or other forms of memory known in the art; and one or more computer readable-storage media 144, such as a hard drive, floppy drive, read/write CD-ROM, DVD, tape drive, flash drive, optical drive, etc.

In an embodiment of the disclosure, program code 130 may be stored on computer readable-storage medium(s) 144. Program code 130 further includes a noise normalization unit 146 containing instructions for normalizing the noise of x-ray images to a pre-specified, target noise level in accordance with the methods disclosed herein and a computer-aided detection (CAD) processing unit 148 containing instructions for automatically processing x-ray images for suspicious regions of interest, also as disclosed herein. CAD processing unit 148 may, for example, comprise instructions for automatically detecting pixels exhibiting signal characteristics of suspicious microcalcifications that should be highlighted and displayed to a radiologist or other user of the system. CAD processing unit 148 may also further comprise instructions for automatically detecting other suspicious anomalies in an anatomical region under study that should be presented.

While image viewing station 110, image acquisition unit 115, and digitizer apparatus 120 are depicted as being separate components within system 100, one skilled in the art will appreciate that any combination of such components may be deployed as parts of a single medical imaging apparatus, computer, computer processor, and/or computer system, or as parts of multiple systems suitably interconnected.

Figure 2:
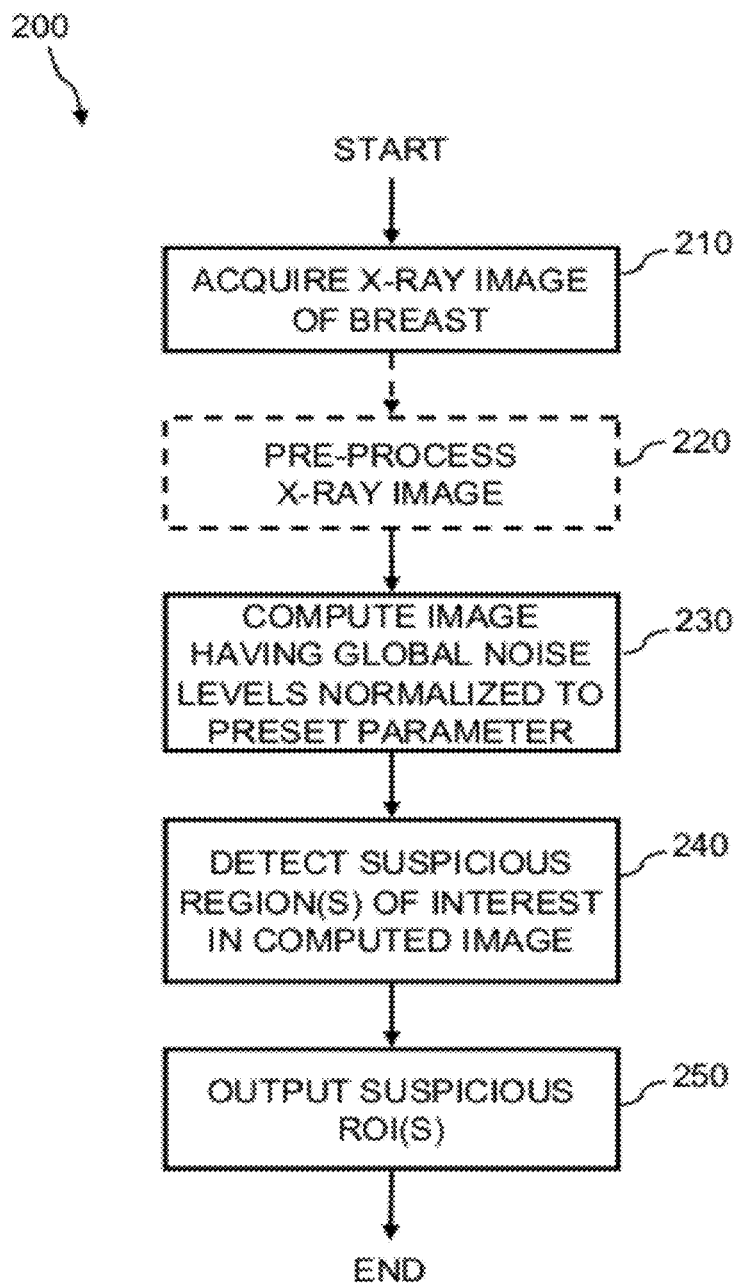
FIG. 2 is a flowchart showing a method that may be performed to identify and output suspicious regions of interest in x-ray images of anatomical regions under study according to an embodiment of the disclosure.

Referring now to FIG. 2, a flowchart of a method 200 of identifying and outputting suspicious regions of interest in an x-ray image of an anatomical region under study is illustrated according to an embodiment of this disclosure. Each step will first be briefly introduced.

At step 210, an x-ray image of an anatomical region under study is acquired in digital form by image viewing station 110. In an embodiment of the disclosure, the anatomy is a human breast, although in other embodiments other anatomical regions may be acquired.

At step 220, the x-ray image may be optionally pre-processed using conventional image processing techniques to enhance the efficiency and/or accuracy of the additional processing steps. Code for performing pre-processing operations at step 220 may be stored in program code 130 of image viewing station 110.

At step 230, the x-ray image is smoothed (i.e., "filtered") and the noise level of the x-ray image after smoothing is automatically measured and used together with the noise level of the original image to compute a globally noise normalized (GNN) image of the anatomical region under study. In the GNN image, noise levels are normalized (i.e., standardized) to a pre-specified or "target" global noise parameter. This step is performed to reduce the effect that the variation in noise from image to image may have, considering that image noise may be attributed to any number of factors that vary from image to image (e.g., imaging source, imaging parameters, the composition of the anatomy itself, etc.).

At step 240, the GNN image is input to a process for automatically identifying suspicious regions of interest (ROIs) in the anatomical region under study. In an embodiment of this disclosure, the process identifies pixels exhibiting signal characteristics of suspicious microcalcifications. The accuracy (i.e., sensitivity and specificity) with which suspicious microcalcifications may be identified in the GNN image has been found to be significantly increased over prior art identification methods that process non-GNN images.

At step 250, information associated with identified suspicious ROIs may then be output to a user of the system (e.g., a physician) for further interpretation and ultimately diagnosis of the health of the anatomy under study.

These steps of method 200 will now be described in greater detail.

There are many different ways in which an x-ray image of an anatomical region under study may be acquired at step 210. For example, in embodiments in which image acquisition unit 115 may be included in system 100, the x-ray image may be acquired by operating image acquisition unit 115 to image a patient's anatomical breast using x-rays and then transmitting the acquired image data to image viewing station 110. Alternatively, image acquisition unit 115 may acquire one or more film x-rays of the anatomical breast under study and the film x-rays may be converted into x-ray images using digitizer apparatus 120. In other embodiments, the x-ray image may be retrieved from storage in memory unit 124 or from storage in a memory unit residing outside of image acquisition unit 115 via a communication interface. The x-ray image may be acquired in many other suitable ways as well.

The x-ray image may be a projection of the anatomical region or any portion of the anatomical region under study from any angle. For example, in embodiments where an x-ray image of the anatomical breast may be acquired, conventional mammographic imaging techniques may project the breast from either the craniocaudal (CC) and/or the mediolateral oblique (MLO) positions, while computed tomographic imaging techniques (e.g., DBT) may project the breast from a series of discrete angles, whereby each image created at a given angle is typically called a "projection." In addition, images at other angles may be utilized.

One pre-processing operation that optionally may be performed at step 220 is the sub-sampling of the x-ray image to approximately 100 micron inter-pixel spacing (IPS). This decreases the time required to process the x-ray image without losing critical information about the anatomical region under study.

Another pre-processing operation that optionally may be performed at step 220 is linear stretching, also referred to as linear contrast enhancement or contrast stretching. This brings the range of intensity values of the x-ray image into an expected range.

Another pre-processing operation that optionally may be performed at step 220 is the identification of the pixels in the x-ray image that constitute all or a portion of the anatomical region under study. This may allow the computer-implemented processing methods described herein to be performed only using the pixels of the anatomical region under study, rather than the entire image including anatomical regions not of clinical interest. In embodiments in which an x-ray image of an anatomical breast is acquired, the anatomical breast region may be identified using any number of suitable automated image processing techniques, which are advantageous over requiring a radiologist or other user to manually identify such regions in the image. One non-limiting example of a suitable image processing technique is a region growing method, such as, but not limited to, the method disclosed in U.S. Pat. No. 6,091,841 "Method and system for segmenting desired regions in digital mammograms" assigned to Qualia Computing, Inc., which is incorporated herein by reference. The pixels constituting the anatomical region (henceforth "breast pixels" for anatomical breasts under study) may be stored for later processing in the form of a binary mask (henceforth "binary breast mask" for anatomical breasts under study). If this optional step is carried out, further processing may be limited to processing those portions of the image which have been identified as constituting part of the anatomical region under study. References to "global" characteristics of images hereinafter may be understood to refer to the characteristics of only the portions of the images identified as constituting part of the anatomical regions under study where appropriate in the context.

According to another embodiment of the disclosure, another pre-processing operation that optionally may be performed at step 220 is gray-scale dependent noise normalization (GDNN). Each input sensor of an x-ray image acquisition unit used to generate x-ray images (e.g., image acquisition unit 115) may have a different gray-scale dependent noise model (GDNM) based on its capture modality and characteristics. Each x-ray image therefore may have a unique gray-scale dependent noise function (GDNF) based on the input sensor GDNM that varies due to imaging technique, acquisition unit settings, and composition of the anatomical region under study. As a result, variations in gray-scale in dark regions of an x-ray cannot be directly compared to variations in gray-scale in bright regions of the x-ray. While this presents less of a problem to a human who may be inspecting the image, as the human eye can accurately accommodate such differences, it may present a significant problem to computer systems and in particular, to algorithms embodied in such systems that rely on quantitative measurements of changes in gray scale to discern abnormal patterns in human anatomy. To compensate for this problem, in accordance with further embodiments of the disclosure, an additional pre-processing operation optionally may be performed at step 220 that normalizes the noise across the gray-scale levels of the x-ray image. One skilled in the art will recognize that there are many different ways to normalize the noise of an x-ray image. One example of such a process will now be described, though other processes may also be utilized.

Noise value estimates may be computed at each breast pixel in the x-ray image and the breast pixels may then be grouped into bins by their respective gray-level values. The specific number of bins and the width of each bin may be determined in accordance with factors such as the characteristics of the anatomical region under study in the image. Ideally, the number and width of the bins should allow for a sufficient number of pixel samples in each bin from which to measure the noise level exhibited at each pixel gray-scale level. For example, in a setting where the image is mapped to a 12-bit gray scale, and the scale is appropriately linearly stretched, bins that are 500 gray-scale values wide and are centered from 750 to 2,750 were empirically found to cover the gray levels exhibited by breast tissue in x-ray mammography. Additional empirical tests could be performed on, for example, other anatomical regions to determine other appropriate bin parameters to utilize in the methods disclosed herein.

In accordance with one embodiment of the disclosure, the noise value estimate for a breast (or other) pixel may be obtained by computing the angular energy at that pixel, as further discussed below. A representative noise level at each gray-scale bin may then be determined from the noise levels associated with the pixels assigned to that bin. In an embodiment of the disclosure, the noise level at each bin may be quantified by computing the mean of the noise values of the bin samples. In addition, as further discussed below, outlying values of angular energy may be discarded prior to computing the mean in order to remove signal and artifact pixels from the noise level estimation. However, one skilled in the art will recognize that other statistical measures of the spread of the noise values in each bin or over all bins may also be utilized.

The collective mean noise level values across all bins may then be processed to estimate an expected noise value at every possible gray-scale pixel value of the image. Collectively, these noise values represent a gray-scale dependent noise function (GDNF) of the image. The GDNF is a function of the gray-scale dependent noise model (GDNM) of the input sensor used to generate the x-ray image. In an embodiment of the disclosure, a fit function initially may be used to generate the GDNF.

Figure 3:
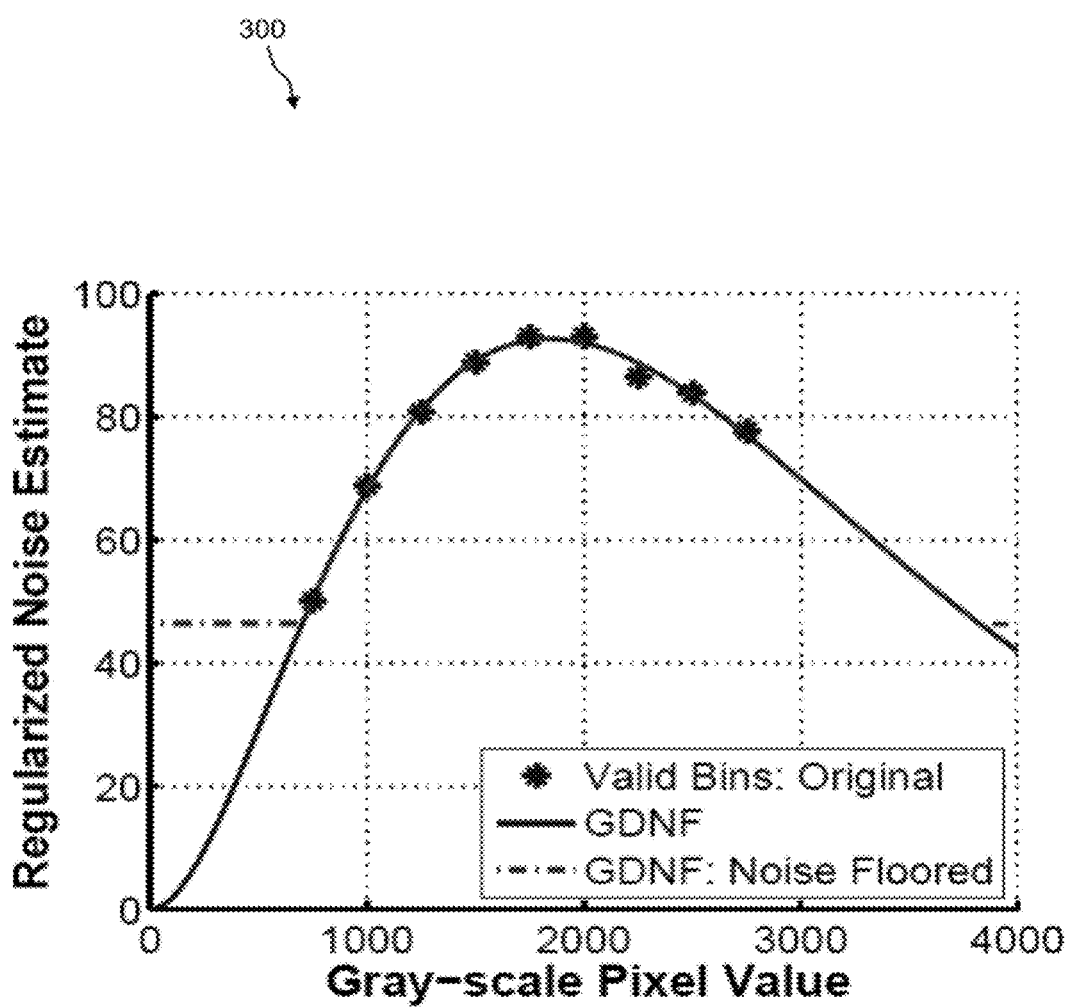
FIG. 3 is a graph illustrating original and noise-floored noise estimates by gray-scale pixel values of an x-ray mammography image according to an embodiment of the disclosure.
Figure 4:
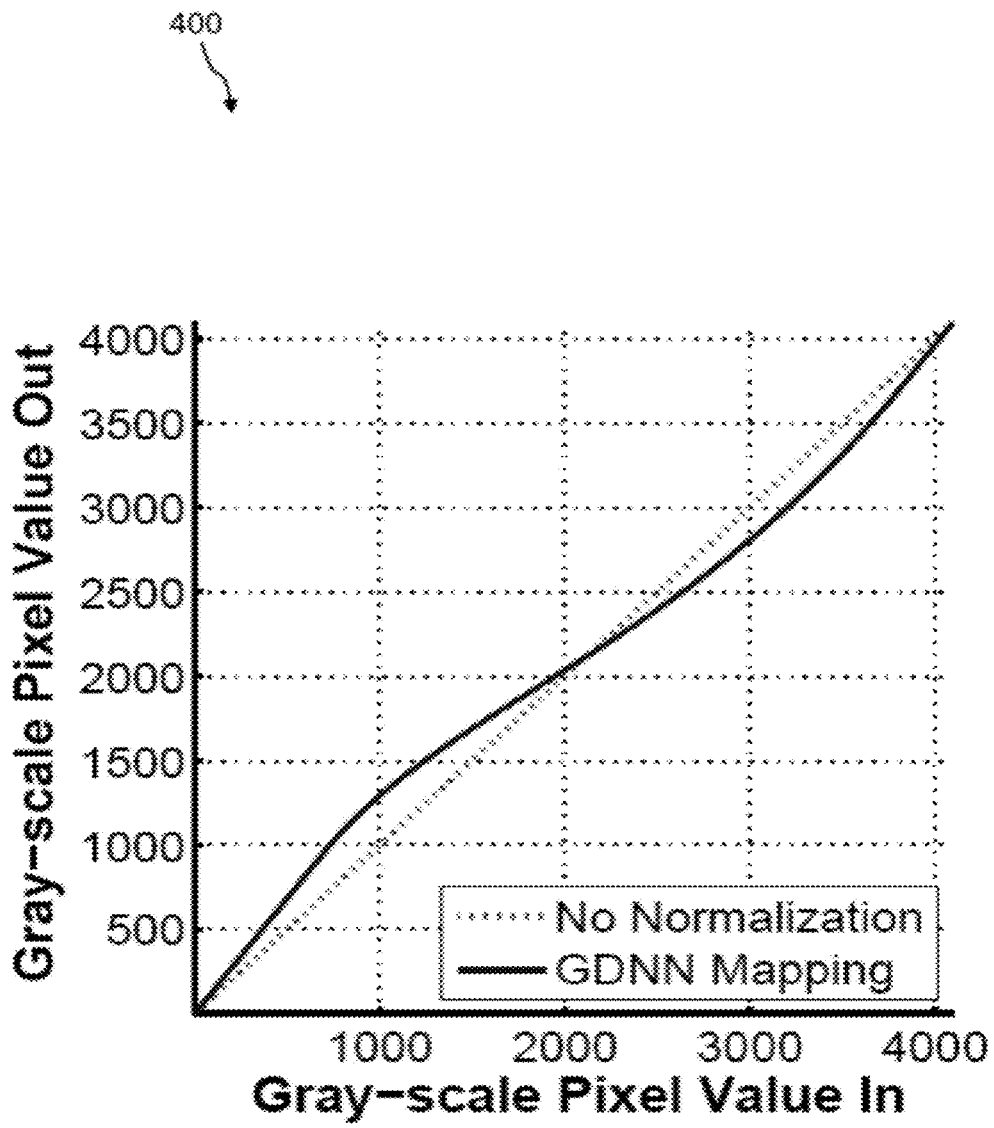
FIG. 4 is a graphical embodiment of a lookup table illustrating the relationship between input and output gray-scale pixel values for the normalization of an x-ray mammography image according to an embodiment of the disclosure.

Thereafter, a gray-scale dependent noise normalized (GDNN) image may be generated as follows. FIG. 3 illustrates an example of an exemplary GDNF for an x-ray image, as it may have been determined, for example, by the methods described above. The regularized noise estimate (RNE) was computed and is plotted across the bins (Valid Bins: Original). In an embodiment of the disclosure, as FIG. 3 further illustrates, the GDNF may be altered so that it never drops below ½ of its highest value (GDNF: Noise Floored). FIG. 4 illustrates the lookup table (LUT) that may then be created by carrying out a process to invert the noise-floored GDNF of FIG. 3 and create a cumulative density function (CDF). The LUT (which provides an adjusted or "normalized" gray-scale value as output for each input gray-scale value) then represents a map between the (original or input) gray-scale values of an unnormalized image of the anatomical breast under the influence of image noise and the (resulting or output) gray-scale values of a GDNN image of the same anatomical breast in which the noise is reduced to a relatively consistent level across gray-scale levels of the x-ray image. (This is accomplished because the CDF creation and GDNF inversion steps create a LUT that effectively stretches the low-noise regions of the gray scale (thus increasing noise), while compressing the high-noise regions (thus reducing noise).

Figure 5:
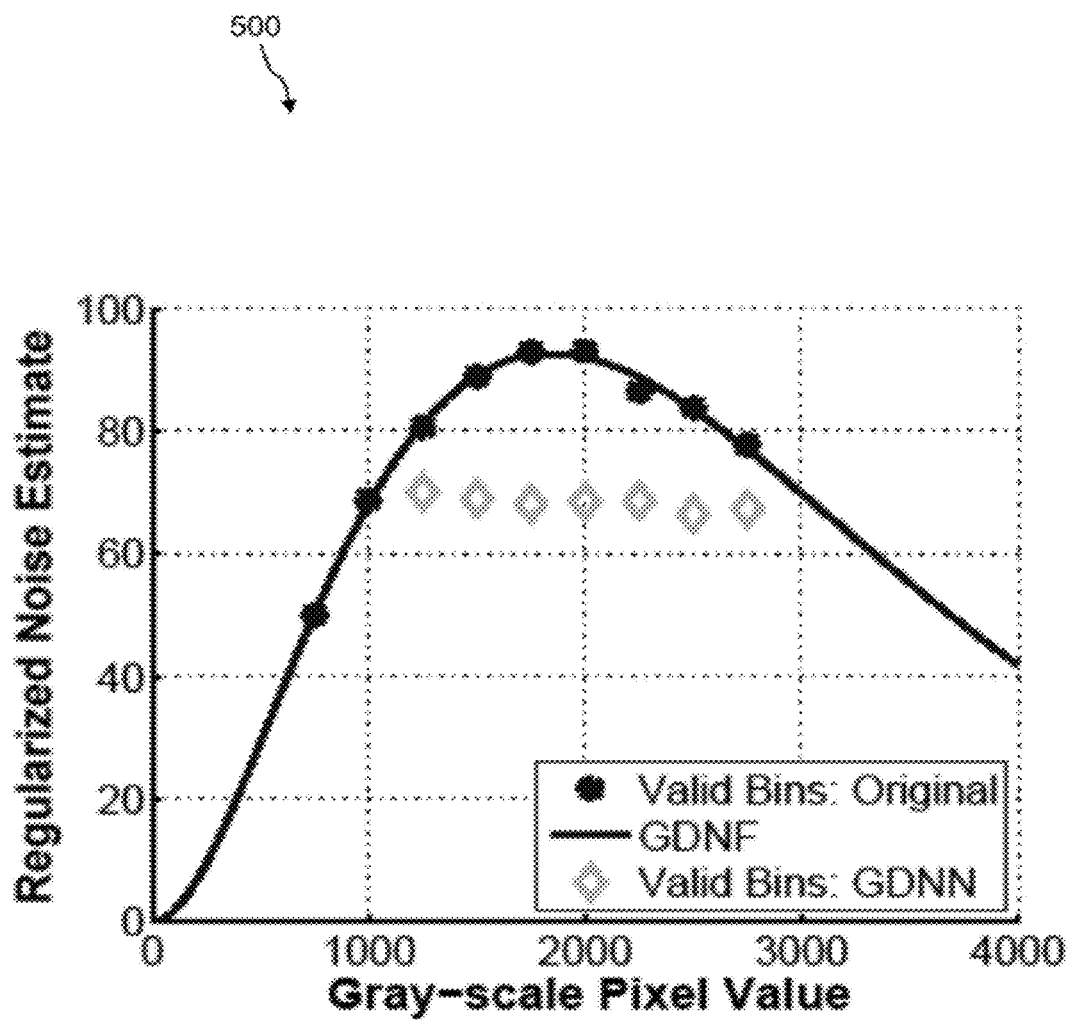
FIG. 5 is a graph illustrating original and normalized noise estimates by gray-scale pixel values of an x-ray mammography image according to an embodiment of the disclosure.

FIG. 5 illustrates an example of the gray scale information relating to an exemplary GDNN x-ray image after adjustment by the LUT. The resulting regularized noise estimates (RNEs) were computed and plotted across the bins (Valid Bins: GDNN), illustrating that, as compared to the original GDNF, after normalization the noise of the GDNN image is very consistent without regard for the gray-scale value of the image over a wide range of gray-scale values. This relatively consistent value may be referred to as the global regularized noise estimate (GRNE) of the image. (As noted above, of course, it may also be understood to refer to a global regularized noise estimate (GRNE) of only a portion of the complete image, if processing has been limited to a portion of the image identified as the anatomical region under study.)

Figure 6:
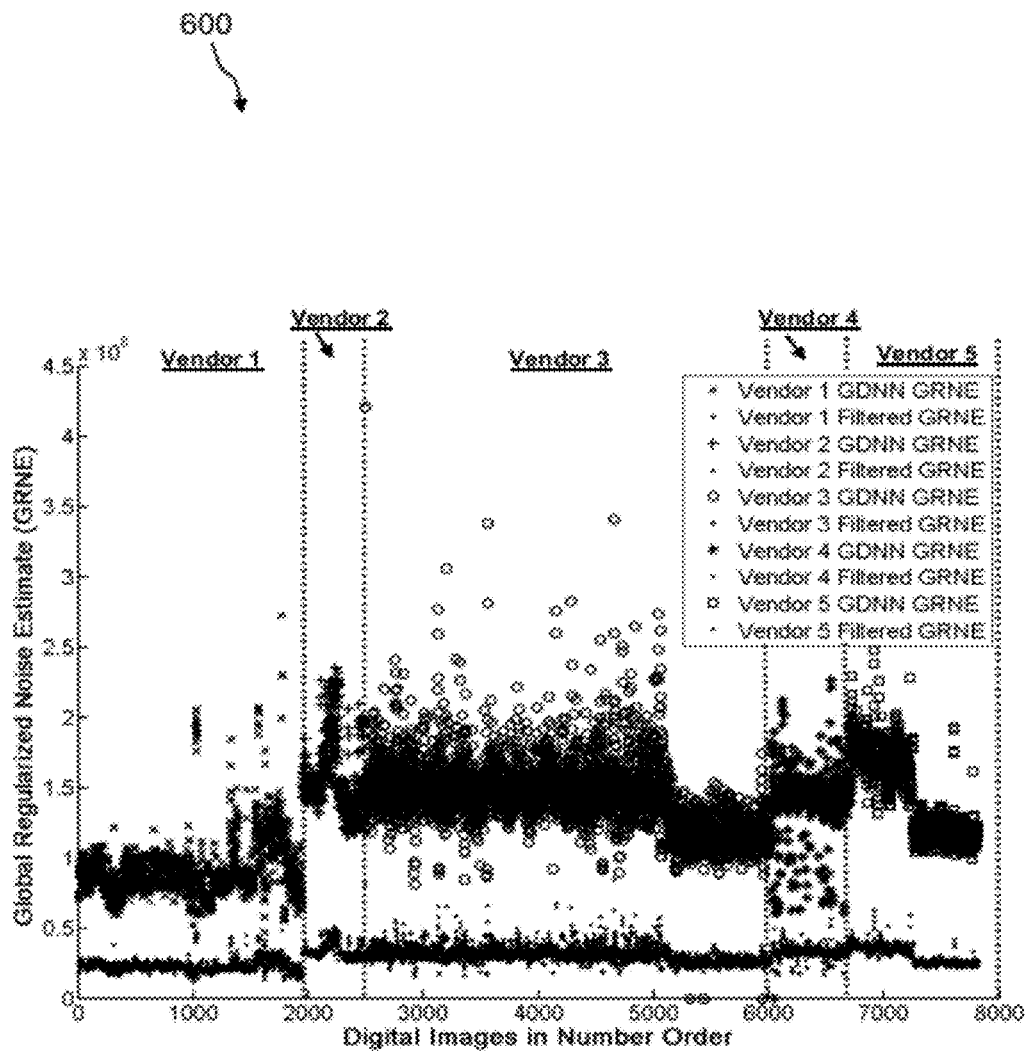
FIG. 6 is a graph illustrating the noise levels of a plurality of original and filtered x-ray mammography images acquired using different sources and parameters after noise normalization by gray-scale pixel values was performed on each image according to an embodiment of the disclosure.

As discussed more fully below, FIG. 6 illustrates global regularized noise estimates (GRNEs) of a plurality of GDNN x-ray images that were acquired using different sources and parameters (referenced in the key with "GDNN GRNE"). FIG. 6 illustrates that even after gray-scale dependent noise normalization (GDNN) there is still significant variability in the level of noise across the multitude of x-ray images that may be acquired of anatomical regions under study. This variability makes it difficult to consistently determine if a particular signal or combination of signals in an x-ray image is indicative of noise, an artifact, or an anomaly such as a microcalcification.

Figure 7:
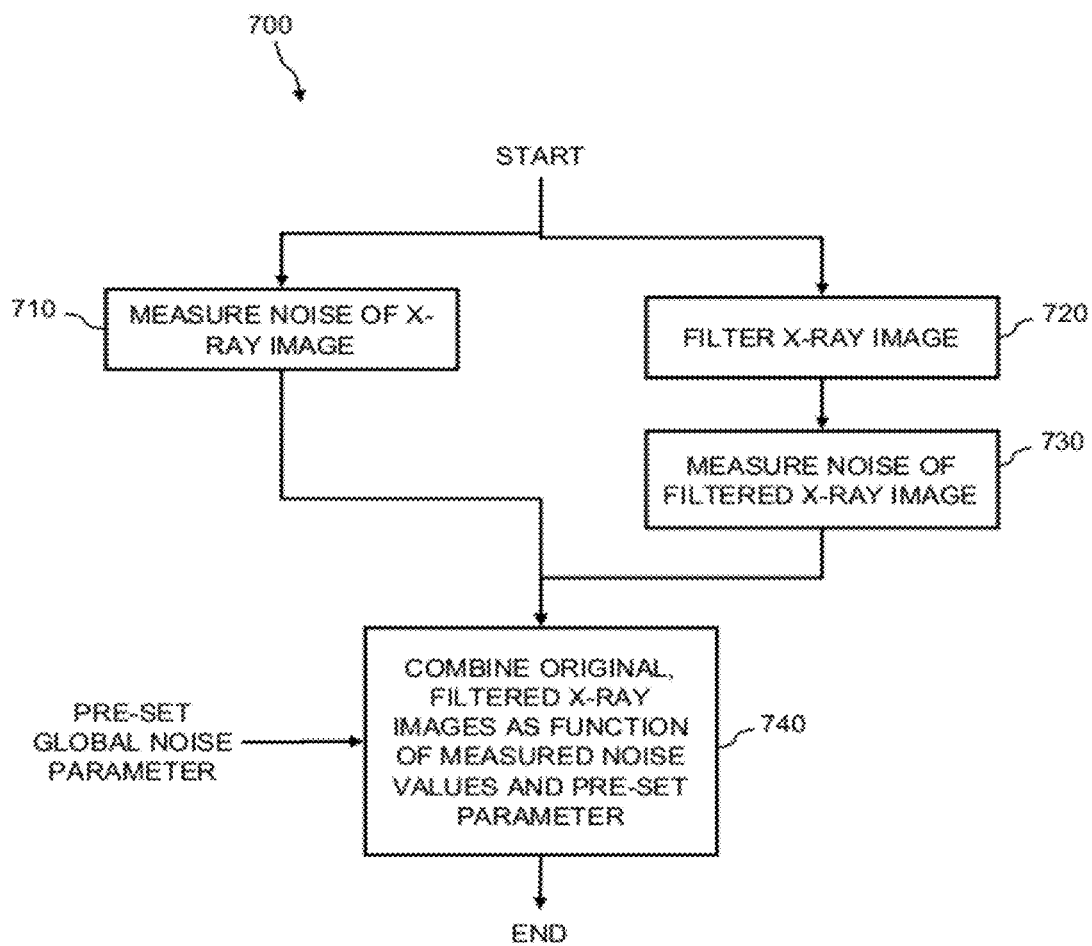
FIG. 7 is a flowchart showing a method that may be performed to measure and normalize the noise of an x-ray image to a pre-set or "target" global noise parameter according to an embodiment of the disclosure.

Again referencing FIG. 2, according to embodiments of this disclosure, this problem may be overcome at step 230 by appropriately mixing the x-ray image with a smoothed (i.e., "filtered") version of the image to form a new image (henceforth, a globally noise normalized image, or GNN, image) having noise levels that meet a pre-defined, target global noise parameter. Referring now to FIG. 7, a flow chart of one method 700 that may be performed to achieve this result is illustrated according to an embodiment of the disclosure. Each step will first be briefly introduced.

At step 710, the noise in the anatomical region under study in the x-ray image is automatically measured from the image.

At step 720, the x-ray image is filtered to create a "smoothed version" of the image of the anatomical region, in which the noise levels are substantially reduced.

At step 730, the noise in the anatomical region under study in the smoothed x-ray image is then automatically measured. Thus, two different noise measurements, an "original" (step 710) and a "filtered" (step 730) noise estimate are computed from the x-ray image.

At step 740, the two noise measurements ("original" and "filtered") are input along with the pre-defined, target global noise parameter into a function that outputs the optimal mix of original and smoothed x-ray image by which to form a GNN image having a noise profile that meets the inputted target global noise level.

These steps of method 700 will now be described in greater detail.

In order to accurately normalize noise levels of an x-ray image, the noise observed in the x-ray image must first be estimated. With no a priori knowledge as to the anatomical content of the x-ray image, it is impossible to definitively separate image noise from image content. Therefore, a metric must be selected that will represent an estimate of noise. According to an embodiment of the disclosure, an angular energy metric may be utilized. Utilizing this metric enables the noise level to be estimated at each individual breast pixel in the x-ray image. Because microcalcifications have limited spatial extent, individual pixel-level noise measurements may be the most accurate way to characterize the signals of potential microcalcifications that may appear in the image. However, one skilled in the art will recognize that other suitable pixel noise estimation techniques may also be utilized instead of or in addition to computations involving angular energy.

At step 710, in accordance with an embodiment of the disclosure, the angular energy at every image breast pixel may be computed by subtracting 9 times the intensity of that pixel from the sum of the intensities of its N8 (i.e.: 3×3) pixel neighborhood (the 9 pixels including the pixel of interest and its 8 closest neighbors), as represented by the formula:

$$E_{x,y} = \left( \sum_{u=x-1}^{x+1} \sum_{v=y-1}^{y+1} I_{u,v} \right) - 9I_{x,y}$$

Summing angular energies over an entire x-ray image will produce components of noise, signal (e.g., microcalcifications), and artifacts (e.g., flashes). Signal and artifact pixels tend to have angular energies with large absolute magnitudes compared to the angular energies of noise pixels, and therefore can greatly affect statistical summaries of image noise. Therefore, identifying and removing these signal and artifact pixel values (i.e., "regularization") decreases the influence of signal and artifact pixels on noise estimates. In accordance with an embodiment of the disclosure, regularization may be performed at step 710 by first computing the standard deviation of the angular energies and excluding from further processing those breast pixels exhibiting absolute angular energy values that are greater than three standard deviations from 0. This process may be repeated using the remaining angular energies until a satisfactory convergence is reached. However, other standard deviation parameters and/or other suitable statistical techniques besides the standard deviation may also be used to remove such outliers. The standard deviation of the angular energies forms a global noise estimate statistic of the anatomical region under study which will be henceforth referred to as an original global regularized noise estimate, or original GRNE. GRNE may be measured in units of gray-scale change per meter. FIG. 6, as discussed previously, presents original GRNE values for a plurality of GDNN x-ray images.

At step 720, a smoothing filter process is performed on the x-ray image. As is known in the art, smoothing filters remove noise in an image by reducing the amount of intensity variation between each pixel and the next. According to an embodiment of the disclosure, the smoothing filter process may involve performing a 3×3 averaging filter operation that replaces the gray-scale value of each breast pixel in the x-ray image with a value based upon the average intensities of pixels in a 3×3 neighborhood around the pixel. Thus, the smoothing filter process forms what will be henceforth referred to as a filtered x-ray image. The 3×3 averaging filter has been found to produce a good tradeoff between noise reduction and processing time, although other filters may also be used.

At step 730, an estimate of the noise in the filtered x-ray image may then be computed. According to an embodiment of the disclosure, the angular energy at every filtered pixel may be computed as described hereinabove. Then, the standard deviation of the angular energies of the filtered pixels may be computed as also described hereinabove. Statistical outliers may be removed as also described hereinabove as a technique to avoid incorrectly characterizing signal and/or artifacts as noise. The standard deviation of the angular energies of the filtered pixels forms a global noise estimate statistic which will be henceforth referred to as a filtered global regularized noise estimate, or filtered GRNE. FIG. 6 also illustrates a plurality of filtered GRNE values for images corresponding to the GDNN images for which values are present.

Because step 710 and the sequence of steps 720 and 730 both are performed using the original x-ray image as input, these operations may be performed serially or in parallel with one another.

Again referencing FIG. 6, it illustrates the possible application of one technique for empirically determining the target global noise parameter that may be employed to normalize the noise in each x-ray image to the target noise level. FIG. 6 illustrates that a target global noise parameter of approximately $0.53 \times 10^6$ gray scale change per meter may be a suitable choice, for exemplary embodiments as described herein, as this level falls between the original and filtered GRNE computations of x-ray images under a wide variety of acquisition conditions, assuming such x-ray images are exemplary of the types of x-ray images that may be acquired and for which the methods disclosed herein are to be performed. However, this target global noise parameter is merely exemplary and other target global noise parameters may also be chosen under different conditions.

For example, for applications of the methods and systems disclosed herein to specific conditions, such as but not limited to a specific image acquisition unit or type of unit (or to units made by a specific vendor), or where the acquisition conditions are restricted or concentrated in a limited range, a target noise parameter may be chosen specifically for the conditions. As another example, a target noise parameter may be chosen based upon knowledge concerning the anatomical region being imaged. For example, different parameters may be used for different types of tissue (e.g., fatty versus dense breast tissue, or breast versus lung tissue). As another example, a target noise parameter may be chosen based upon the type of anomaly being searched for (e.g., microcalcification).

Since the original and filtered GRNE values for an acquired x-ray image will be unknown a priori and will vary as shown in FIG. 6, a critical computation is the amount or mix of the original and smoothed images that should be combined at step 740 to form a GNN image so that the resulting noise level meets the target global noise parameter desired. This relationship may be expressed according to the equation:

$$I_{GNN}(x,y) = \phi * I_{original}(x,y) + (1-\phi) * I_{smoothed}(x,y)$$

where $\phi$ represents the mix fraction parameter ($0 \leq \phi \leq 1$), and I(x, y) is the pixel intensity value of pixel (x, y).

In order to determine how the mixing fraction $\phi$ might be determined, the actual GRNEs of combined images were computed using $\phi$ values of 1, ¾, ½, ¼, and 0 for a set of test images, and these actual GRNEs were plotted against $\phi$ for each image. These results showed that a hyperbolic function provides a reasonable estimate of the variation of GRNE with $\phi$ for an image. Therefore, according to an embodiment of the disclosure, a hyperbolic function may be used to compute the optimal mix $\phi$ with which to combine the original and smoothed x-ray images at step 740 given the original and filtered GRNE computations and the known target GRNE. However, other functions may be used to meet a target GRNE based on original and filtered GRNE computations.

According to an embodiment of the disclosure, therefore, the optimal mix $\phi$ with which to combine the original and smoothed x-ray images at step 740 may be found by determining the parameters 'h', 'k', 'a', and 'b' in the hyperbolic formula:

$$\frac{(x-h)^2}{a^2} - \frac{(y-k)^2}{b^2} = 1$$

where x represents the mix or "weight" ("$\phi$") of the original GRNE used to create the combined GNN image, and y represents the actual GRNE desired to be observed in the GNN image that results from the combination. With the parameters 'h', 'k', 'a', and 'b' known for a given image, the required mix fraction x (or "$\phi$") may be determined by inserting the desired target GRNE as y.

In an embodiment of this disclosure, therefore, the 4 parameters 'h', 'k', 'a', and 'b' must be estimated before an optimal weight $\phi$ can be determined for combining the original and the smoothed image to achieve a desired actual GRNE y. Under normal circumstances, estimating the optimal weight x for a given image would require at least four measurements for that image, namely the original GRNE, the filtered GRNE, and at least two arbitrary combinations, in order for the four unknown parameters to be found. Combining the original and smoothed images and estimating the GRNEs of the resulting combined images are computationally intensive processes, however. In accordance with one embodiment, therefore, to reduce the computational time associated with executing step 740 for each image, the parameters 'h', 'k', 'a', and 'b' may be optimized and at least partially preset during a testing phase. As a result, in the operational phase, only the original and filtered GRNEs of the x-ray image (without the additional two arbitrary combinations) are required as input to the hyperbolic function to output an optimal weight $\phi$ for an image.

In accordance with an embodiment of the disclosure, the optimal parameters 'h', 'k', 'a', and 'b' may be at least partially preset by fitting hyperbolas to sets of 5 actual GRNE values produced by combining the original and filtered GRNEs of a series of test images at the five combinatory values of $\phi=1$, ¾, ½, ¼, and 0. The 4 parameters for use in operation with a particular image then can be estimated in operation using only the 2 GRNEs (original and smoothed) of the actual image in the following manner:

h by observing the measured results for the series of hyperbolas fit to the test image data as described above, the hyperbola may be determined to be centered at x=0, and the value of h therefore may be set equal to 0 for all cases, a by observing the measured results for the series of hyperbolas fit to the test image data as described above, it may be determined that a remains relatively constant for all images, and therefore one may specify a=0.3766 (the mean of the observed values) for all cases, b by observing the measured results for the series of hyperbolas fit to the test image data as described above, it may be determined that there is a linear relationship between the difference in GRNEs (original minus smoothed) and b, and therefore, using the least squared error fit of all observed values to define the linear relationship, one may specify that for each specific image b=0:5736* ($GRNE_{original} - GRNE_{smoothed}$)+1.9621, for the $GRNE_{original}$ and $GRNE_{smoothed}$ measured for that image.

and k by observing the measured results for the series of hyperbolas fit to the test image data as described above, it may be determined that the linear relationship between the difference in GRNEs (original minus smoothed) and k is less pronounced than that for b. Therefore, k may be determined for a specific image by performing a least squared error fit of all observed values to determine the value of k as a function of ($GRNE_{original} - GRNE_{smoothed}$) (rather than assuming a linear relationship), and then using the difference between the two data points ($GRNE_{original} - GRNE_{smoothed}$) that results from measuring the GRNE for that specific original and filtered image to find the appropriate value of k on the fit curve, with the other parameters set as described above.

These parameters and the methods of setting them are merely exemplary, however, and different parameters may be determined for different sets of test images using these techniques, or other techniques may be employed for determining the values of the four parameters, or other techniques than a hyperbolic equation may be used to determine the mixing fraction $\phi$.

After mixing the original and filtered x-ray images at the computed weights to form the GNN image, an estimate as to the noise of the resulting GNN image may then be computed. According to an embodiment of the disclosure, the angular energy at every breast pixel in the GNN image may be computed as described hereinabove. Then, a standard deviation measurement of the angular energies may be computed as also described hereinabove. Statistical outliers may be removed as also described hereinabove as a technique to avoid incorrectly characterizing signal and/or artifacts as noise. The standard deviation of the angular energies forms a global noise estimate statistic of the GNN image which will be henceforth referred to as an actual GRNE of the GNN image, as opposed to the target GRNE described hereinabove.

Figure 8:
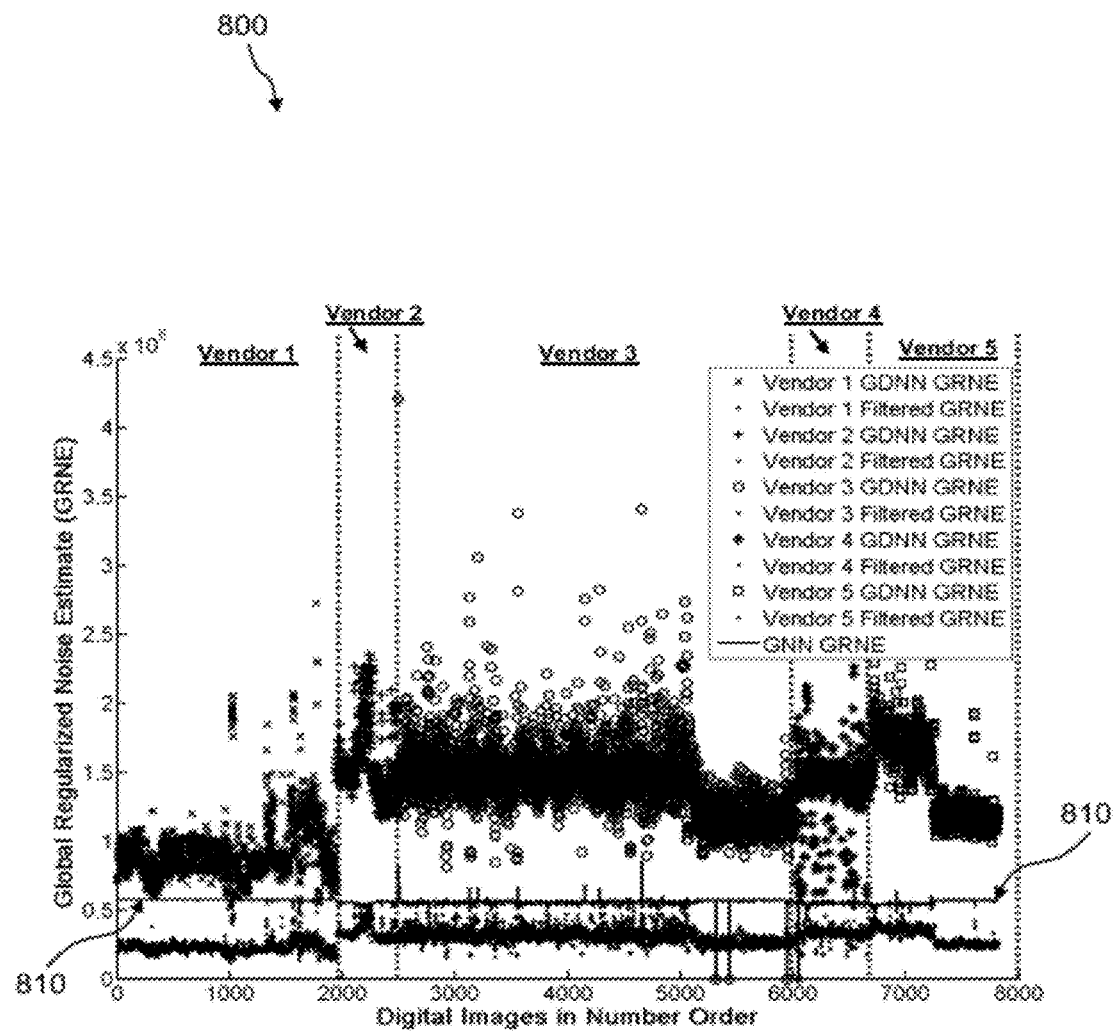
FIG. 8 is a graph illustrating the actual global noise parameters of a plurality of x-ray mammography images acquired using different sources and parameters after processing according to an embodiment of the disclosure.

The accuracy in which actual GRNEs meet the target GRNE was tested over a set of test images of anatomical breasts under study. FIG. 8 illustrates the original or "GDNN GRNEs", the filtered GRNEs, and the actual or "GNN GRNEs" (plotted on the y-axis) for a plurality of x-ray images that were acquired using different sources and parameters (enumerated on the x-axis) and processed with the methods disclosed herein. The solid line of FIG. 8 (which is labeled as 810 and is noted in the figure key as "GNN GRNE") connects the actual GRNEs measured from computed GNN images after the methods were performed on a plurality of test x-ray images from different sensors, imaging parameters, breast compositions, etc. FIG. 8 demonstrates the accuracy with which the variability of the noise signals presented in an x-ray image may be standardized to yield a nearly-constant GRNE or global regularized noise estimate.

In some x-ray images shown in FIG. 8, particularly when the original GRNE is below the target GRNE or when the filtered GRNE is above the target GRNE, the actual GRNE may fail to meet the target GRNE desired. The latter case, for example, was observed in some very noisy images. In accordance with one embodiment of the disclosure, the actual GRNE may be measured from the GNN image at step 740 as described hereinabove, stored as a parameter in memory, and read for use in additional processing of the GNN image. This allows any measurement of image contrast or texture to be normalized with the knowledge that the GNN image has an actual GRNE that does not meet the target.

Again referencing FIG. 2, having produced a GNN image (and, in certain embodiments, an actual GRNE computation of the GNN image) of all or a portion of the anatomical region under study in which the noise variability has been normalized at step 230, the pixels of the GNN image may be automatically processed at step 240 to identify potential suspicious ROIs that may be of interest to a physician. In an embodiment of the disclosure, the x-ray images taken of an anatomical breast may be input to a process for automatically detecting suspicious microcalcifications. As described hereinabove, microcalcifications appear as bright spots in a cluster and are particularly problematic for computer systems to identify in imagery having variable noise levels due to their small spatial extent. However, one skilled in the art will recognize that many processes using computed statistics to identify ROIs in medical imagery may benefit from the noise normalization methods disclosed herein, and thus the processing of the GNN image is not limited to the exemplary microcalcification detection process presented hereinbelow.

Exemplary Microcalcification Detection Process

Figure 9:
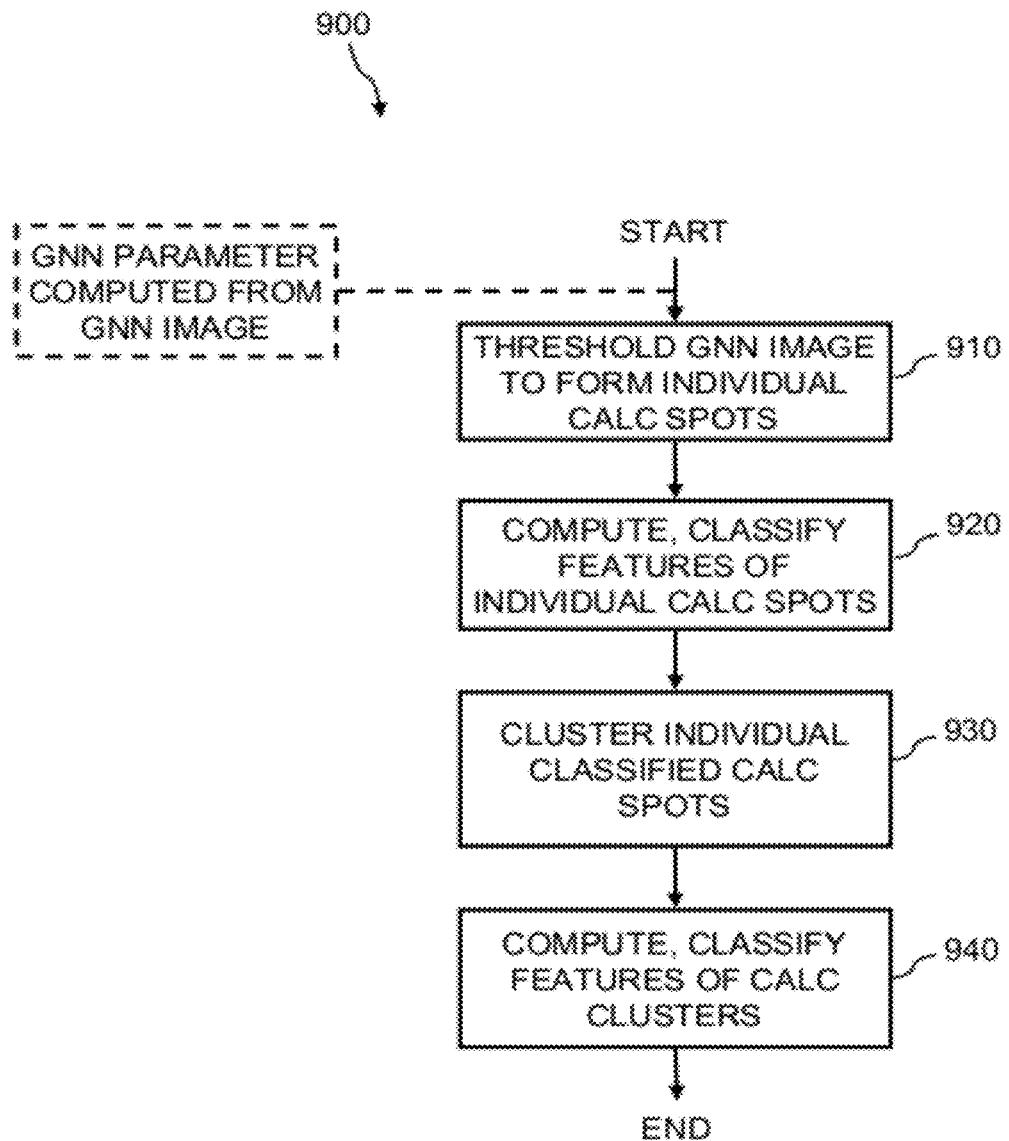
FIG. 9 is a flowchart showing a method that may be performed to automatically identify suspected microcalcifications in an x-ray image according to an embodiment of the disclosure.

FIG. 9 is a flow chart of a computer-implemented method 900 for detecting microcalcifications in a GNN image of an anatomical breast that may be implemented at step 240 in accordance with an embodiment of this disclosure. Each step will first be briefly introduced. At step 910, the GNN image may be thresholded to segment potential detections of microcalcifications from the remainder of the GNN image. At step 920, features of each potential microcalcification spot may then be computed and used for classification. At step 930, classified microcalcification spots may then be clustered to form clusters of potential microcalcifications. Finally, at step 940, features of each potential microcalcification cluster may then be computed and used for additional classification. These steps of method 900 will now be described in greater detail.

The GNN image will contain differences in gray levels between potential microcalcifications and background. Thus, individual pixels in the image may be marked as potential microcalcification pixels if their value is greater than some threshold value and as background pixels otherwise. There are numerous techniques for automatically determining a gray level value for use in thresholding the GNN image at step 910. In accordance with one embodiment, a local thresholding technique may be used in which statistics such as the mean, median, standard deviation, etc. may be computed from local pixel regions of the GNN image and used to threshold local areas of the GNN image for distinguishing between microcalcification targets and background signal. In accordance with another embodiment, a global thresholding technique may be used in which a histogram of the GNN image is formed and an upper fraction of the histogram representing the maximum gray level in the image may be computed and used as a value for thresholding microcalcification targets from background signal of the GNN image. In accordance with yet another embodiment, values derived from both a local and a global thresholding technique may be combined to compute a suitable thresholding value. Other suitable thresholding techniques may alternatively be performed.

The thresholded GNN image may be represented by a binary mask in which pixels thresholded as background are represented by a '0' and pixels thresholded as suspected microcalcifications are represented by a '1.' False detections such as macrocalcifications, noise spikes, or fine linear structures (which often present high local values due to high angular energies across the linear structure) may be thresholded as suspected microcalcifications at step 910. To avoid falsely marking these spots as suspected microcalcifications, features of the pixels representing each individual suspected microcalcification spot may be measured from the GNN image and used to classify the spot at step 920. Computer-based classification algorithms such as, but not limited to, linear classifiers or neural networks that have been trained from the statistics of features of true microcalcifications and/or false microcalcification detections may be invoked to compute a classification decision for thresholded detection spots.

According to an embodiment of the disclosure, one feature that may be measured and evaluated for classification of suspected microcalcifications at step 920 is "mean separation." The mean separation feature has good statistical discrimination power between microcalcifications and false detections. This feature examines the relationship between the statistics of the intensity of the pixels that were thresholded as suspected microcalcifications and the pixels in a neighborhood of the suspected microcalcifications that were thresholded as background. In an embodiment of the disclosure, the mean separation feature may be computed according to the formula:

$$\text{mean separation} = \frac{\mu_{on} - \mu_{off}}{\mu_{on} + \mu_{off}}$$

where $\mu_{on}$ equals the mean of the intensity of pixels thresholded as suspected microcalcifications and $\mu_{off}$ equals the mean of the intensity of pixels in a neighborhood of the suspected microcalcifications that were thresholded as background. According to an embodiment of the disclosure, the neighborhood may be an area of $3 \times 10^{-5}$ meters$^2$.

Many true microcalcifications exhibit large statistical differences in intensity when compared with neighboring background pixels, whereas false detections exhibit smaller statistical differences in intensity when compared with neighboring background pixels. However, intensity dependent noise in images not processed by the noise normalization techniques described herein has been found to incorrectly skew features such as the "mean separation" feature, and thus result in misclassification of microcalcifications in terms of both false positives (i.e., background pixels that were incorrectly reported as suspected microcalcifications) and false negatives (i.e., true microcalcifications that were failed to be reported as such). By measuring features such as the "mean separation" feature on GNN images, however, the feature statistics are no longer skewed by image noise variability, and thus are more accurate in terms of distinguishing microcalcification from background signal. Computer-based classification algorithms trained from the statistics of such features may also vary in results due to image noise if trained on images not processed by the noise normalization techniques described herein. In accordance with an embodiment of this disclosure, therefore, feature statistics used to train such algorithms may also be measured from GNN images to avoid variability in training due to image noise variability.

According to an embodiment of the disclosure, a plurality of feature statistics may be measured and evaluated for classification of suspected microcalcifications at step 920. By way of one example, in addition to the "mean separation" feature described hereinabove, additional feature statistics that may be useful in discriminating microcalcifications from background signal include contrast features and texture features of individual spots. Like the "mean separation" feature, contrast and texture features are statistics that are also highly susceptible to image noise. Of course, other features could be computed and used for classification of suspected microcalcification spots instead of or in addition to those referenced hereinabove.

Because microcalcifications will typically appear in a cluster, the individual suspected microcalcification spots may be grouped into microcalcification clusters at step 930. This may be desirable in order to report suspicious detections as a cluster. This may also be desirable to further eliminate false detections based on features exhibited by the clusters. In accordance with an embodiment of the disclosure, clusters may be formed from individual microcalcification spots when a predefined number of individual detections (e.g., 5) are located within a predefined area (e.g., 1 $cm^2$). However, other cluster grouping techniques may also be performed at step 930.

A plurality of feature statistics may be measured and evaluated for classification of microcalcification clusters at step 940. According to an embodiment of the disclosure, the "mean separation" feature described hereinabove may be used to examine the relationship between the statistics of the intensity of the pixels that were grouped as part of a suspected microcalcification cluster and the pixels in a neighborhood of the suspected microcalcification cluster that were thresholded as background. Again, the feature statistics for the GNN images are no longer skewed by image noise variability and thus are more accurate in terms of distinguishing microcalcification clusters from clustered background signal. In addition to the "mean separation" feature described hereinabove, additional feature statistics that may be useful in discriminating microcalcification clusters from background signal may include eigenvalue features of the covariance matrix of points in the cluster, interpoint distance features of points in the cluster, and the area of a bounding box enclosing the cluster. Of course, other features could be computed and evaluated for classification of suspected microcalcification clusters instead of or in addition to those referenced hereinabove.

Again referencing FIG. 2, at step 250 information regarding one or more of the identified suspicious ROIs found by the above methods may be output through an output device to aid a physician in interpreting the health of the anatomy under study. In accordance with an embodiment of the disclosure, the locations of ROIs identified in the GNN image of the anatomy under study may be used to produce CAD marks at the corresponding locations in the original x-ray image. By way of example, the CAD marks may be rectangular bounding boxes surrounding the entire ROI (e.g., microcalcification cluster). By way of another example, contours may be drawn around the perimeter of the ROI and/or drawn around the perimeters of each individual spot within an ROI cluster (e.g., individual microcalcifications in a cluster) so as to highlight the pixels within each cluster that were detected as individual spots. Other CAD marks may also be used to convey the locations of identified ROIs. The original x-ray image with CAD marks may then be transmitted to a graphical user interface such as GUI 140 for display to the physician. Although in one embodiment the original x-ray image with CAD marks is output, any of the processed imagery (e.g., the filtered x-ray image, the GNN image) may also be suitable imagery for display and diagnosis purposes.

In other embodiments of the disclosure, at step 250, information regarding the one or more identified suspicious ROIs may be transmitted to a printer or other suitable devices or systems known in the art for outputting image signals in a viewable format.

Although the methods set forth in this disclosure are especially designed for use in a mammographic computer-aided detection (CAD) system to improve the sensitivity and specificity of microcalcification detection, the disclosure has application wherever noise may negatively impact the statistics of a medical image and may be applied, for example, to detect other suspicious regions of interest in x-rays of other anatomical regions under study.

This disclosure also may be applied to improve the sensitivity and specificity of automated region of interest detection, especially but not limited to automated microcalcification detection, in emerging breast imaging modalities such as tomosynthesis. In tomosynthesis, the human breast is imaged using low-dose x-rays at a number of discrete projection angles (e.g., 10) over a small rotation angle (e.g., 40 degrees). The noise in the resulting individual projection x-ray images may be normalized to substantially equal levels using the methods disclosed herein. Statistics of the pixels of each individual GNN projection x-ray image may then be processed to identify suspicious regions of interest such as microcalcifications. Alternatively, computer software may be used to construct a three-dimensional (3-D) volume of the anatomical breast (i.e., a "reconstructed volume") from the series of GNN projection x-ray images. According to an embodiment of the disclosure, the computer software may comprise a direct filtered backprojection algorithm which, upon execution, computes a 3-D volume as a series of 40-60 individual images ("slices") that are reconstructed along a single plane of the imaged object (the "reconstruction plane"). Thus, each slice of the 3-D volume would be a "GNN slice" because it would have the same noise levels at different depths and with a different thickness throughout the anatomical breast or other imaged object. Statistics of the pixels or voxels of the reconstructed volume may then be processed in accordance with the methods described hereinabove with less error due to image noise variability, leading to higher accuracy of detection of volumetric lesions or other regions of interest.

The disclosure also has application to region of interest detection in medical x-ray images where multiple organs are imaged, such as chest x-rays where the lung and heart (among other organs) are imaged. In such applications, unlike medical x-ray images containing a single organ (e.g., the breast), the differences in noise levels across the multiple organs (as well as other factors influencing noise described hereinabove) may make it difficult to consistently meet a single, pre-determined or "target" GNN from the single original and single filtered x-ray image. To solve this problem, rather than modify the entire image to meet a single predetermined noise level, the individual organs may first be segmented into sub-images and each sub-image may be modified to a predetermined target noise level using the methods described hereinabove. The predetermined noise levels may thus be different from sub-image to sub-image across a single x-ray image.

Having described the system, computer-readable medium, medical imaging apparatus, and method disclosed herein in detail and by reference to specific embodiments thereof, it will be apparent that modifications and variations are possible without departing from the scope of this disclosure.

The invention claimed is:

1. A computer-readable medium having computer-readable instructions stored thereon which, as a result of being executed in a computer system having at least one input device, at least one processor, and at least one output device, instructs the computer system to identify and output suspicious regions of interest in a digital x-ray image of at least a portion of an anatomical region under study, said instructions comprising instructions for
   a. receiving, through at least one input device, a digital x-ray image of at least a portion of an anatomical region under study, the digital x-ray image being characterized by first global noise characteristics;
   b. computing, in at least one processor, a first global noise estimate for at least a portion of the received image;
   c. computing, in at least one processor, a modified digital x-ray image of at least a portion of the anatomical region under study, the modified digital x-ray image being characterized by second global noise characteristics, wherein, the modified digital x-ray image has associated with it a second global noise estimate of about a predetermined noise value;
   d. identifying, in at least one processor, at least one suspicious region of interest in the at least a portion of the anatomical region under study using the modified digital x-ray image; and
   e. outputting, through at least one output device for use by at least one user, information associated with the at least one suspicious region of interest identified.

2. The computer-readable medium of claim 1 wherein outputting comprises displaying at least one image of at least a portion of the anatomical region under study wherein the at least one suspicious region of interest identified is specially depicted.

3. The computer-readable medium of claim 1 wherein the modified image is computed based upon at least a portion of the digital x-ray image and at least a portion of a filtered x-ray image of the anatomical region under study.

4. The computer-readable medium of claim 3, further comprising normalizing the noise of at least a portion of the digital x-ray image prior to computing the modified image.

5. The computer-readable medium of claim 4, wherein normalizing the noise of at least a portion of the digital x-ray image comprises gray-scale dependent noise normalization.

6. The computer-readable medium of claim 5, wherein the first global noise estimate is computed based upon the gray-scale dependent noise normalization of at least a portion of the digital x-ray image.

7. The computer-readable medium of claim 3 wherein at least a portion of the filtered x-ray image has associated with it a third global noise estimate, the third global noise estimate being less than the first global noise estimate.

8. The computer-readable medium of claim 7 wherein the modified image is computed based upon at least a portion of the digital x-ray image and at least a portion of the filtered x-ray image by using the first global noise estimate, the predetermined noise value, and the third global noise estimate.

9. The computer-readable medium of claim 8 wherein the modified image is computed by combining a weighted average of the at least a portion of digital x-ray image and at least a portion of the filtered x-ray image.

10. The computer-readable medium of claim 9 wherein the modified image is computed by combining a weighted average of individual pixels of at least a portion of the digital x-ray image and individual pixels of at least a portion of the filtered x-ray image.

11. The computer-readable medium of claim 10 wherein weights of at least a portion of the digital x-ray image and of at least a portion of the filtered x-ray image are computed by means of a hyperbolic function.

12. The computer-readable medium of claim 11 wherein the hyperbolic function is of a form $$\frac{(x-h)^2}{a^2} - \frac{(y-k)^2}{b^2} = 1,$$

where x is a weight of at least a portion of the digital x-ray image, y is the predetermined noise value, h=0, a is a constant, and b and k are determined from the first global noise estimate and the third global noise estimate.

13. The computer-readable medium of claim 12 wherein the modified digital x-ray image is a globally noise normalized image.

14. The computer-readable medium of claim 1 wherein identifying at least one suspicious region of interest comprises measuring statistics of the modified image and comparing the measured statistics against parametric characteristics of suspicious regions of interest.

15. The computer-readable medium of claim 14 wherein the measured statistics are compared against parametric characteristics of microcalcifications.

16. The computer-readable medium of claim 1 wherein the anatomical region under study comprises at least a portion of a human breast.

17. The computer-readable medium of claim 1 wherein:
   the anatomical region under study comprises at least a portion of a human breast;
   the first global noise estimate is computed based upon a gray-scale dependent noise normalization of at least a portion of the digital x-ray image;
   the modified image is computed based upon at least a portion of the gray-scale dependent noise normalized (GDNN) digital x-ray image and at least a portion of a GDNN filtered x-ray image of the anatomical region under study, said at least a portion of the GDNN filtered x-ray image having associated with it a third global noise estimate less than the first global noise estimate, and the modified image being computed by using the first global noise estimate, the predetermined noise value, and the third global noise estimate;

the modified image is a globally noise normalized image computed by combining a weighted average of individual pixels of at least a portion of the GDNN digital x-ray image and individual pixels of at least a portion of the g GDNN filtered x-ray image, weights of at least a portion of the GDNN digital x-ray image and of at least a portion of the GDNN filtered x-ray image being computed by means of a hyperbolic function of a form $$\frac{(x-h)^2}{a^2} - \frac{(y-k)^2}{b^2} = 1,$$

where x is a weight of at least a portion of the GDNN digital x-ray image, y is the predetermined noise value, h=0, a is a constant, and b and k are determined from the first global noise estimate and the third global noise estimate; and outputting comprises displaying at least one image of at least a portion of the anatomical region under study wherein the at least one suspicious region of interest identified is specially depicted.

18. The computer-readable medium of claim 17 wherein identifying at least one suspicious region of interest comprises measuring statistics of the modified image and comparing the measured statistics against parametric characteristics of microcalcifications.

19. The computer-readable medium of claim 1 wherein the digital x-ray image is produced by at least one of a mammography imaging system, a computed tomography imaging system, and a tomosynthesis mammography imaging system.

20. A system for identifying and outputting suspicious regions of interest in a digital x-ray image of at least a portion of an anatomical region under study, comprising:

at least one input device, configured to receive a digital x-ray image of at least a portion of an anatomical region under study, the digital x-ray image being characterized by first global noise characteristics;

at least one processor, configured to:
a. compute a first global noise estimate for at least a portion of the received image;
b. compute a modified digital x-ray image of at least a portion of the anatomical region under study, the modified digital x-ray image being characterized by second global noise characteristics,
wherein the modified digital x-ray image has associated with it a second global noise estimate of about a predetermined noise value; and
c. identify at least one suspicious region of interest in the at least a portion of the anatomical region under study using the modified digital x-ray image; and at least one output device, configured to output, for use by at least one user, information associated with the at least one suspicious region of interest identified.

21. The system of claim 20, wherein outputting comprises displaying at least one image of at least a portion of the anatomical region under study wherein the at least one suspicious region of interest identified is specially depicted.

22. The system of claim 20, wherein the modified image is computed based upon at least a portion of the digital x-ray image and at least a portion of a filtered x-ray image of the anatomical region under study.

23. The system of claim 22, wherein the at least one processor is configured further to normalize the noise of at least a portion of the digital x-ray image prior to computing the modified image.

24. The system of claim 23, wherein normalizing the noise of at least a portion of the digital x-ray image comprises gray-scale dependent noise normalization.

25. The system of claim 24, wherein the first global noise estimate is computed based upon the gray-scale dependent noise normalization of at least a portion of the digital x-ray image.

26. The system of claim 22, wherein at least a portion of the filtered x-ray image has associated with it a third global noise estimate, the third global noise estimate being less than the first global noise estimate.

27. The system of claim 26, wherein the modified image is computed based upon at least a portion of the digital x-ray image and at least a portion of the filtered x-ray image by using the first global noise estimate, the predetermined noise value, and the third global noise estimate.

28. The system of claim 27, wherein the modified image is computed by combining a weighted average of the at least a portion of digital x-ray image and at least a portion of the filtered x-ray image.

29. The system of claim 28, wherein the modified image is computed by combining a weighted average of individual pixels of at least a portion of the digital x-ray image and individual pixels of at least a portion of the filtered x-ray image.

30. The system of claim 29, wherein weights of at least a portion of the digital x-ray image and of at least a portion of the filtered x-ray image are computed by means of a hyperbolic function.

31. The system of claim 30, wherein the hyperbolic function is of a form $$\frac{(x-h)^2}{a^2} - \frac{(y-k)^2}{b^2} = 1,$$

where x is a weight of at least a portion of the digital x-ray image, y is the predetermined noise value, h=0, a is a constant, and b and k are determined from the first global noise estimate and the third global noise estimate.

32. The system of claim 31, wherein the modified digital x-ray image is a globally noise normalized image.

33. The system of claim 20, wherein identifying at least one suspicious region of interest comprises measuring statistics of the modified image and comparing the measured statistics against parametric characteristics of suspicious regions of interest.

34. The system of claim 33, wherein the measured statistics are compared against parametric characteristics of microcalcifications.

35. The system of claim 20, wherein the anatomical region under study comprises at least a portion of a human breast.

36. The system of claim 20, wherein:
the anatomical region under study comprises at least a portion of a human breast;
the first global noise estimate is computed based upon a gray-scale dependent noise normalization of at least a portion of the digital x-ray image;
the modified image is computed based upon at least a portion of the gray-scale dependent noise normalized (GDNN) digital x-ray image and at least a portion of a GDNN filtered x-ray image of the anatomical region under study, said at least a portion of the GDNN filtered x-ray image having associated with it a third global noise estimate less than the first global noise estimate, and the modified image being computed by using the first global noise estimate, the predetermined noise value, and the third global noise estimate;

the modified image is a globally noise normalized image computed by combining a weighted average of individual pixels of at least a portion of the GDNN digital x-ray image and individual pixels of at least a portion of the g GDNN filtered x-ray image, weights of at least a portion of the GDNN digital x-ray image and of at least a portion of the GDNN filtered x-ray image being computed by means of a hyperbolic function of a form $$\frac{(x-h)^2}{a^2} - \frac{(y-k)^2}{b^2} = 1,$$

where x is a weight of at least a portion of the GDNN digital x-ray image, y is the predetermined noise value, h=0, a is a constant, and b and k are determined from the first global noise estimate and the third global noise estimate; and outputting comprises displaying at least one image of at least a portion of the anatomical region under study wherein the at least one suspicious region of interest identified is specially depicted.

37. The system of claim 36, wherein identifying at least one suspicious region of interest comprises measuring statistics of the modified image and comparing the measured statistics against parametric characteristics of microcalcifications.

38. The system of claim 20, wherein the digital x-ray image is produced by at least one of a mammography imaging system, a computed tomography imaging system, and a tomosynthesis mammography imaging system.

39. In a computer system comprising at least one input device, at least one processor and at least one output device, a method to identify and output suspicious regions of interest in a digital x-ray image of at least a portion of an anatomical region under study, said method comprising:
   a. receiving, through at least one input device, a digital x-ray image of at least a portion of an anatomical region under study, the digital x-ray image being characterized by first global noise characteristics;
   b. computing, in at least one processor, a first global noise estimate for at least a portion of the received image;
   c. computing, in at least one processor, a modified digital x-ray image of at least a portion of the anatomical region under study, the modified digital x-ray image being characterized by second global noise characteristics,
   wherein, the modified digital x-ray image has associated with it a second global noise estimate of about a predetermined noise value;
   d. identifying, in at least one processor, at least one suspicious region of interest in the at least a portion of the anatomical region under study using the modified digital x-ray image; and
   e. outputting, through at least one output device for use by at least one user, information associated with the at least one suspicious region of interest identified.

40. The method of claim 39, wherein outputting comprises displaying at least one image of at least a portion of the anatomical region under study wherein the at least one suspicious region of interest identified is specially depicted.

41. The method of claim 39, wherein the modified image is computed based upon at least a portion of the digital x-ray image and at least a portion of a filtered x-ray image of the anatomical region under study.

42. The method of claim 41, further comprising normalizing the noise of at least a portion of the digital x-ray image prior to computing the modified image.

43. The method of claim 42, wherein normalizing the noise of at least a portion of the digital x-ray image comprises gray-scale dependent noise normalization.

44. The method of claim 43, wherein the first global noise estimate is computed based upon the gray-scale dependent noise normalization of at least a portion of the digital x-ray image.

45. The method of claim 41, wherein at least a portion of the filtered x-ray image has associated with it a third global noise estimate, the third global noise estimate being less than the first global noise estimate.

46. The method of claim 45, wherein the modified image is computed based upon at least a portion of the digital x-ray image and at least a portion of the filtered x-ray image by using the first global noise estimate, the predetermined noise value, and the third global noise estimate.

47. The method of claim 46, wherein the modified image is computed by combining a weighted average of the at least a portion of digital x-ray image and at least a portion of the filtered x-ray image.

48. The method of claim 47, wherein the modified image is computed by combining a weighted average of individual pixels of at least a portion of the digital x-ray image and individual pixels of at least a portion of the filtered x-ray image.

49. The method of claim 48, wherein weights of at least a portion of the digital x-ray image and of at least a portion of the filtered x-ray image are computed by means of a hyperbolic function.

50. The method of claim 49, wherein the hyperbolic function is of a form $$\frac{(x-h)^2}{a^2} - \frac{(y-k)^2}{b^2} = 1,$$

where x is a weight of at least a portion of the digital x-ray image, y is the predetermined noise value, h=0, a is a constant, and b and k are determined from the first global noise estimate and the third global noise estimate.

51. The method of claim 50, wherein the modified digital x-ray image is a globally noise normalized image.

52. The method of claim 39, wherein identifying at least one suspicious region of interest comprises measuring statistics of the modified image and comparing the measured statistics against parametric characteristics of suspicious regions of interest.

53. The method of claim 52, wherein the measured statistics are compared against parametric characteristics of microcalcifications.

54. The method of claim 39, wherein the anatomical region under study comprises at least a portion of a human breast.

55. The method of claim 39, wherein:
   the anatomical region under study comprises at least a portion of a human breast;
   the first global noise estimate is computed based upon a gray-scale dependent noise normalization of at least a portion of the digital x-ray image;
   the modified image is computed based upon at least a portion of the gray-scale dependent noise normalized (GDNN) digital x-ray image and at least a portion of a GDNN filtered x-ray image of the anatomical region under study, said at least a portion of the GDNN filtered x-ray image having associated with it a third global noise estimate less than the first global noise estimate, and the modified image being computed by using the first global noise estimate, the predetermined noise value, and the third global noise estimate;

the modified image is a globally noise normalized image computed by combining a weighted average of individual pixels of at least a portion of the GDNN digital x-ray image and individual pixels of at least a portion of the g GDNN filtered x-ray image, weights of at least a portion of the GDNN digital x-ray image and of at least a portion of the GDNN filtered x-ray image being computed by means of a hyperbolic function of a form $$\frac{(x-h)^2}{a^2} - \frac{(y-k)^2}{b^2} = 1,$$

where x is a weight of at least a portion of the GDNN digital x-ray image, y is the predetermined noise value, h=0, a is a constant, and b and k are determined from the first global noise estimate and the third global noise estimate; and outputting comprises displaying at least one image of at least a portion of the anatomical region under study wherein the at least one suspicious region of interest identified is specially depicted.

56. The method of claim 55, wherein identifying at least one suspicious region of interest comprises measuring statistics of the modified image and comparing the measured statistics against parametric characteristics of microcalcifications.

57. The method of claim 39, wherein the digital x-ray image is produced by at least one of a mammography imaging system, a computed tomography imaging system, and a tomosynthesis mammography imaging system.

58. A medical image processing apparatus for performing computer-assisted analysis of digital x-ray images, comprising:

at least one imaging source configured to obtain a plurality of digital x-ray images of at least a portion of an anatomical region under study in response to x-rays propagated through a patient;
wherein each image in the plurality of images represents a view of at least a portion of the anatomical region under study from a different angle;
at least one processor coupled to the at least one imaging source configured to:
a. compute a plurality of modified digital x-ray images from at least a portion of the digital x-ray images such that a global noise estimate of each modified digital x-ray image is about a predetermined noise value; and
b. process a plurality of modified digital x-ray images to identify at least one suspicious region of interest in the anatomical region under study; and
at least one output device coupled to the at least one processor configured to output information associated with at least one suspicious region of interest identified.

59. The medical image processing apparatus of claim 58 wherein the at least one processor is configured to compute a three-dimensional digital image from a plurality of modified digital x-ray images and to process at least a portion of the three-dimensional digital image to identify at least one suspicious region of interest in the anatomical region under study.

60. The medical image processing apparatus of claim 59 wherein the at least one processor is configured to identify at least one suspicious region of interest by processing pixels of individual slices of the three-dimensional digital image.

61. The medical image processing apparatus of claim 59 wherein the at least one processor is configured to identify at least one suspicious region of interest by processing voxels of the three-dimensional digital image.

62. The medical image processing apparatus of claim 58 wherein the at least one processor is configured to compute a modified digital x-ray image by filtering at least a portion of a digital x-ray image and combining the digital x-ray image with a filtered digital x-ray image.

63. The medical image processing apparatus of claim 62 wherein the at least one processor is configured to combine a weighted average of at least a portion of the digital x-ray image and at least a portion of the filtered digital x-ray digital image to compute the modified digital x-ray image.

64. The medical image processing apparatus of claim 63 wherein the at least one processor is configured to compute the modified digital x-ray image using a global noise estimate of the digital x-ray image, a global noise estimate of the filtered digital x-ray image, and the predetermined noise value.

65. The medical image processing apparatus of claim 58 wherein the at least one imaging source is at least one of a tomosynthesis medical imaging apparatus and a computed tomography medical imaging apparatus.

66. A computer-readable medium having computer-readable instructions stored thereon which, as a result of being executed in a system having at least one imaging source, at least one processor, and at least one output device, instructs the computer system to perform computer-assisted analysis of digital x-ray images, said instructions comprising instructions for:

a. obtaining by means of at least one imaging source a plurality of digital x-ray images of at least a portion of an anatomical region under study in response to x-rays propagated through a patient;
wherein each image in the plurality of images represents a view of at least a portion of the anatomical region under study from a different angle;
b. computing in at least one processor a plurality of modified digital x-ray images from at least a portion of the digital x-ray images such that a global noise estimate of each modified digital x-ray image is about a predetermined noise value;
c. processing in at least one processor a plurality of modified digital x-ray images to identify at least one suspicious region of interest in the anatomical region under study; and
d. outputting by means of at least one output device information associated with at least one suspicious region of interest identified.

67. The computer-readable medium of claim 66 further comprising instructions for computing in at least one processor a three-dimensional digital image from a plurality of modified digital x-ray images and processing at least a portion of the three-dimensional digital image to identify at least one suspicious region of interest in the anatomical region under study.

68. The computer-readable medium of claim 67 further comprising instructions for identifying in at least one processor at least one suspicious region of interest by processing pixels of individual slices of the three-dimensional digital image.

69. The computer-readable medium of claim 67 further comprising instructions for identifying in at least one processor at least one suspicious region of interest by processing voxels of the three-dimensional digital image.

70. The computer-readable medium of claim 66 further comprising instructions for computing in at least one processor a modified digital x-ray image by filtering at least a portion of a digital x-ray image and combining the digital x-ray image with a filtered digital x-ray image.

71. The computer-readable medium of claim 70 further comprising instructions for combining in at least one processor a weighted average of at least a portion of the digital x-ray image and at least a portion of the filtered digital x-ray digital image to compute the modified digital x-ray image.

72. The computer-readable medium of claim 71 further comprising instructions for computing in at least one processor the modified digital x-ray image using a global noise estimate of the digital x-ray image, a global noise estimate of the filtered digital x-ray image, and the predetermined noise value.

73. The computer-readable medium of claim 66 wherein the at least one imaging source is at least one of a tomosynthesis medical imaging apparatus and a computed tomography medical imaging apparatus.

74. In a computer system comprising at least one imaging source, at least one processor and at least one output device, a method to identify and output suspicious regions of interest in a digital x-ray image of at least a portion of an anatomical region under study, said method comprising:
    a. obtaining by means of at least one imaging source a plurality of digital x-ray images of at least a portion of an anatomical region under study in response to x-rays propagated through a patient;
        wherein each image in the plurality of images represents a view of at least a portion of the anatomical region under study from a different angle;
    b. computing in at least one processor a plurality of modified digital x-ray images from at least a portion of the digital x-ray images such that a global noise estimate of each modified digital x-ray image is about a predetermined noise value;
    c. processing in at least one processor a plurality of modified digital x-ray images to identify at least one suspicious region of interest in the anatomical region under study; and
    d. outputting by means of at least one output device information associated with at least one suspicious region of interest identified.

75. The method of claim 74 further comprising computing in at least one processor a three-dimensional digital image from a plurality of modified digital x-ray images and processing at least a portion of the three-dimensional digital image to identify at least one suspicious region of interest in the anatomical region under study.

76. The method of claim 75 further comprising identifying in at least one processor at least one suspicious region of interest by processing pixels of individual slices of the three-dimensional digital image.

77. The method of claim 75 further comprising identifying in at least one processor at least one suspicious region of interest by processing voxels of the three-dimensional digital image.

78. The method of claim 74 further comprising computing in at least one processor a modified digital x-ray image by filtering at least a portion of a digital x-ray image and combining the digital x-ray image with a filtered digital x-ray image.

79. The method of claim 78 further comprising combining in at least one processor a weighted average of at least a portion of the digital x-ray image and at least a portion of the filtered digital x-ray digital image to compute the modified digital x-ray image.

80. The method of claim 79 further comprising computing in at least one processor the modified digital x-ray image using a global noise estimate of the digital x-ray image, a global noise estimate of the filtered digital x-ray image, and the predetermined noise value.

81. The method of claim 74 wherein the at least one imaging source is at least one of a tomosynthesis medical imaging apparatus and a computed tomography medical imaging apparatus.

82. A computer-readable medium having computer-readable instructions stored thereon which, as a result of being executed in a computer system having at least one input device, at least one processor, and at least one output device, instructs the computer system to identify and output suspicious regions of interest in a digital x-ray image of at least a portion of an anatomical region under study, said instructions comprising instructions for:
    a. receiving, through at least one input device, a digital x-ray image of at least a portion of an anatomical region under study, the digital x-ray image being characterized by first global noise characteristics;
    b. filtering, in at least one processor, at least a portion of the received digital x-ray image;
    c. mixing, in at least one processor, the filtered at least a portion of the received digital x-ray image with a corresponding at least a portion of the received digital x-ray image, to create a mixed digital x-ray image such that a global noise estimate of the mixed digital x-ray image is about a predetermined noise value;
    d. identifying, in at least one processor, at least one suspicious region of interest in the anatomical region under study based on the mixed digital x-ray image; and
    e. outputting, by means of at least one output device, information associated with the at least one suspicious region of interest identified.

83. The computer-readable medium of claim 82 wherein outputting comprises displaying at least a portion of the digital x-ray image of the anatomical region under study such that the at least one suspicious region of interest identified is specially depicted.

84. A system for identifying and outputting suspicious regions of interest in a digital x-ray image of at least a portion of an anatomical region under study, comprising:
    at least one input device, configured to receive a digital x-ray image of at least a portion of an anatomical region under study, the digital x-ray image being characterized by first global noise characteristics;
    at least one processor, configured to:
    a. filter at least a portion of the received digital x-ray image;
    b. mix the filtered at least a portion of the received digital x-ray image with a corresponding at least a portion of the received digital x-ray image, to create a mixed digital x-ray image such that a global noise estimate of the mixed digital x-ray image is about a predetermined noise value; and
    c. identify at least one suspicious region of interest in the anatomical region under study based on the mixed digital x-ray image; and
    at least one output device, configured to output information associated with the at least one suspicious region of interest identified.

85. The system of claim 84, wherein outputting comprises displaying at least a portion of the digital x-ray image of the anatomical region under study such that the at least one suspicious region of interest identified is specially depicted.

86. In a computer system comprising at least one input device, at least one processor and at least one output device, a method to identify and output suspicious regions of interest in a digital x-ray image of at least a portion of an anatomical region under study, said method comprising:
    a. receiving, through at least one input device, a digital x-ray image of at least a portion of an anatomical region under study, the digital x-ray image being characterized by first global noise characteristics;
    b. filtering, in at least one processor, at least a portion of the received digital x-ray image;
    c. mixing, in at least one processor, the filtered at least a portion of the received digital x-ray image with a corresponding at least a portion of the received digital x-ray image, to create a mixed digital x-ray image such that a global noise estimate of the mixed digital x-ray image is about a predetermined noise value;
    d. identifying, in at least one processor, at least one suspicious region of interest in the anatomical region under study based on the mixed digital x-ray image; and
    e. outputting, to at least one output device, information associated with the at least one suspicious region of interest identified.

87. The method of claim 86, wherein outputting comprises displaying at least a portion of the digital x-ray image of the anatomical region under study such that the at least one suspicious region of interest identified is specially depicted.

* * * * *